US 8,503,991 B2

(12) United States Patent
Swift et al.

(10) Patent No.: US 8,503,991 B2
(45) Date of Patent: Aug. 6, 2013

(54) METHODS AND APPARATUS TO MONITOR MOBILE DEVICES

(75) Inventors: Roderick D. Swift, Walnut Creek, CA (US); Gregory R. Simon, San Francisco, CA (US); Manjirnath Chatterjee, San Francisco, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 540 days.

(21) Appl. No.: 12/418,266

(22) Filed: Apr. 3, 2009

(65) Prior Publication Data

US 2009/0305680 A1    Dec. 10, 2009

Related U.S. Application Data

(60) Provisional application No. 61/041,920, filed on Apr. 3, 2008.

(51) Int. Cl.
*H04M 3/42* (2006.01)
(52) U.S. Cl.
USPC ............... 455/414.1; 455/425; 455/67.11; 455/67.7; 455/115.1; 455/115.4; 455/155.1
(58) Field of Classification Search
None
See application file for complete search history.

(56) References Cited

U.S. PATENT DOCUMENTS

| | | | |
|---|---|---|---|
| 2,757,226 | A | 7/1956 | Zworykin |
| 4,361,851 | A | 11/1982 | Asip et al. |
| 4,558,302 | A | 12/1985 | Welch |
| 4,658,290 | A | 4/1987 | McKenna et al. |

(Continued)

FOREIGN PATENT DOCUMENTS

| | | |
|---|---|---|
| CA | 2551998 | 7/2005 |
| EP | 0849909 | 6/1998 |

(Continued)

OTHER PUBLICATIONS

Jain et al. "Congestion Avoidance in Computer Networks With a Connectionless Network Layer," Digital Equipment Corporation, Copyright 1988, Version: Jun. 1, 1997 (21 pages).

(Continued)

*Primary Examiner* — Willie J Daniel, Jr.
(74) *Attorney, Agent, or Firm* — Hanley, Flight and Zimmerman, LLC

(57) ABSTRACT

Methods and apparatus to monitor mobile devices are disclosed. A disclosed example method involves operating first and second wireless telephone device terminals. In the example method, the first wireless telephone device terminal includes a first media decoder configured to decode a first media encoding format and the second wireless telephone device terminal includes a second media decoder configured to decode a second media encoding format. The example method also involves receiving a first media presentation via the first wireless telephone device terminal and a second media presentation via the second wireless telephone device terminal. The first media presentation is encoded using the first media encoding format and the second media presentation is encoded using the second media encoding format. The first and second media presentations include substantially similar media content. The example method also involves generating a first reference signature of the first media presentation and a second reference signature of the second media presentation. The first reference signature is stored in association with first device identifier information indicative of the first wireless telephone device terminal. The second reference signature is stored in association with second device identifier information indicative of the second wireless telephone device terminal.

20 Claims, 22 Drawing Sheets

U.S. PATENT DOCUMENTS

| | | | |
|---|---|---|---|
| 4,677,466 A | 6/1987 | Lert, Jr. et al. |
| 5,016,269 A | 5/1991 | Rogers |
| 5,031,204 A | 7/1991 | McKernan |
| 5,119,104 A | 6/1992 | Heller |
| 5,214,687 A | 5/1993 | Kansakoski et al. |
| 5,241,534 A | 8/1993 | Omuro et al. |
| 5,289,526 A | 2/1994 | Chymyck et al. |
| 5,319,638 A | 6/1994 | Lin |
| 5,345,392 A | 9/1994 | Mito et al. |
| 5,390,232 A | 2/1995 | Freeman et al. |
| 5,436,653 A | 7/1995 | Ellis et al. |
| 5,444,745 A | 8/1995 | Ali-Vehmas |
| 5,451,839 A | 9/1995 | Rappaport et al. |
| 5,460,901 A | 10/1995 | Syrjala |
| 5,481,294 A | 1/1996 | Thomas et al. |
| 5,483,276 A | 1/1996 | Brooks et al. |
| 5,490,204 A | 2/1996 | Gulledge |
| 5,572,246 A | 11/1996 | Ellis et al. |
| 5,579,124 A | 11/1996 | Aijala et al. |
| 5,603,084 A | 2/1997 | Henry, Jr. et al. |
| 5,603,095 A | 2/1997 | Uola |
| 5,621,454 A | 4/1997 | Ellis et al. |
| 5,642,353 A | 6/1997 | Roy, III et al. |
| 5,644,776 A | 7/1997 | De Rose et al. |
| 5,673,306 A | 9/1997 | Amadon et al. |
| 5,675,510 A | 10/1997 | Coffey et al. |
| 5,678,170 A | 10/1997 | Grube et al. |
| 5,699,244 A | 12/1997 | Clark, Jr. et al. |
| 5,796,952 A | 8/1998 | Davis et al. |
| 5,799,154 A | 8/1998 | Kuriyan |
| 5,857,190 A | 1/1999 | Brown |
| 5,859,838 A | 1/1999 | Soliman |
| 5,872,588 A | 2/1999 | Aras et al. |
| 5,938,721 A | 8/1999 | Dussell et al. |
| 5,978,657 A | 11/1999 | Suzuki |
| 5,987,306 A | 11/1999 | Nilsen et al. |
| 5,991,735 A | 11/1999 | Gerace |
| 6,006,260 A | 12/1999 | Barrick, Jr. et al. |
| 6,012,096 A | 1/2000 | Link et al. |
| 6,087,952 A | 7/2000 | Prabhakaran |
| 6,108,637 A | 8/2000 | Blumenau |
| 6,115,680 A | 9/2000 | Coffee et al. |
| 6,138,147 A | 10/2000 | Weaver et al. |
| 6,212,386 B1 | 4/2001 | Briere et al. |
| 6,229,840 B1 | 5/2001 | Ichihara |
| 6,256,498 B1 | 7/2001 | Ludwig |
| 6,285,879 B1 | 9/2001 | Lechner et al. |
| 6,311,073 B1 | 10/2001 | Charpentier et al. |
| 6,353,929 B1 | 3/2002 | Houston |
| 6,366,773 B1 | 4/2002 | Ihara et al. |
| 6,393,300 B1 | 5/2002 | Doutheau et al. |
| 6,397,256 B1 | 5/2002 | Chan et al. |
| 6,405,245 B1 | 6/2002 | Burson et al. |
| 6,405,251 B1 | 6/2002 | Bullard et al. |
| 6,411,725 B1 | 6/2002 | Rhoads |
| 6,418,424 B1 | 7/2002 | Hoffberg et al. |
| 6,434,385 B1 | 8/2002 | Aucoeur |
| 6,467,089 B1 | 10/2002 | Aust et al. |
| 6,470,386 B1 | 10/2002 | Combar et al. |
| 6,480,497 B1 | 11/2002 | Flammer, III et al. |
| 6,493,327 B1 | 12/2002 | Fingerhut |
| 6,516,189 B1 | 2/2003 | Frangione et al. |
| 6,519,241 B1 | 2/2003 | Theimer |
| 6,523,175 B1 | 2/2003 | Chan |
| 6,581,025 B2 | 6/2003 | Lehman |
| 6,591,312 B1 | 7/2003 | Greaves et al. |
| 6,604,100 B1 | 8/2003 | Fernandez et al. |
| 6,609,102 B2 | 8/2003 | Kolls |
| 6,622,116 B2 | 9/2003 | Skinner et al. |
| 6,714,778 B2 | 3/2004 | Nykanen et al. |
| 6,741,684 B2 | 5/2004 | Kaars |
| 6,745,011 B1 | 6/2004 | Hendrickson et al. |
| 6,754,470 B2 | 6/2004 | Hendrickson et al. |
| 6,788,926 B1 | 9/2004 | Frangione et al. |
| 6,791,472 B1 | 9/2004 | Hoffberg |
| 6,807,515 B2 | 10/2004 | Vogel et al. |
| 6,834,308 B1 | 12/2004 | Ikezoye et al. |
| 6,900,737 B1 | 5/2005 | Ardalan et al. |
| 6,928,280 B1 | 8/2005 | Xanthos et al. |
| 6,939,233 B2 | 9/2005 | Emmerson |
| 7,013,136 B2 | 3/2006 | Frangione et al. |
| 7,130,616 B2 | 10/2006 | Janik |
| 7,174,293 B2 | 2/2007 | Kenyon et al. |
| 7,185,352 B2 | 2/2007 | Hallford et al. |
| 7,194,752 B1 | 3/2007 | Kenyon et al. |
| 7,194,758 B1 | 3/2007 | Waki et al. |
| 7,206,647 B2 | 4/2007 | Kumar |
| 7,220,910 B2 | 5/2007 | Plastina et al. |
| 7,222,071 B2 | 5/2007 | Neuhauser et al. |
| 7,224,974 B2 | 5/2007 | Benco et al. |
| 7,289,643 B2 | 10/2007 | Brunk et al. |
| 7,302,573 B2 | 11/2007 | Kogure et al. |
| 7,302,574 B2 | 11/2007 | Conwell et al. |
| 7,343,317 B2 | 3/2008 | Jokinen et al. |
| 7,362,091 B2 * | 4/2008 | Heisler et al. ............ 324/754.07 |
| 7,386,473 B2 | 6/2008 | Blumenau |
| 7,502,367 B2 | 3/2009 | Becher et al. |
| 7,506,059 B2 | 3/2009 | Mulligan |
| 7,549,052 B2 | 6/2009 | Haitsma et al. |
| 7,555,306 B2 * | 6/2009 | Liu .............................. 455/522 |
| 7,587,473 B2 | 9/2009 | Benco et al. |
| 7,587,732 B2 | 9/2009 | Wright et al. |
| 7,590,568 B2 | 9/2009 | Blumenau |
| 7,613,635 B2 | 11/2009 | Blumenau |
| 7,644,156 B2 | 1/2010 | Blumenau |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,783,489 B2 | 8/2010 | Kenyon et al. |
| 7,849,154 B2 | 12/2010 | Grecco et al. |
| 8,064,951 B2 | 11/2011 | Woodson et al. |
| 8,121,591 B2 * | 2/2012 | Topaltzas ...................... 455/423 |
| 8,145,966 B2 * | 3/2012 | Roblett et al. ................. 714/737 |
| 8,169,952 B2 | 5/2012 | Woodson et al. |
| 8,180,393 B2 | 5/2012 | Phillips et al. |
| 2001/0003828 A1 | 6/2001 | Peterson et al. |
| 2001/0037407 A1 | 11/2001 | Dragulev et al. |
| 2001/0052077 A1 | 12/2001 | Fung et al. |
| 2002/0019985 A1 | 2/2002 | Fuccello et al. |
| 2002/0025795 A1 | 2/2002 | Sharon et al. |
| 2002/0029267 A1 | 3/2002 | Sankuratripati et al. |
| 2002/0059218 A1 | 5/2002 | August et al. |
| 2002/0107726 A1 | 8/2002 | Torrance et al. |
| 2002/0112048 A1 | 8/2002 | Gruyer et al. |
| 2002/0133393 A1 | 9/2002 | Tatsumi et al. |
| 2002/0143961 A1 | 10/2002 | Siegel et al. |
| 2002/0178410 A1 | 11/2002 | Haitsma et al. |
| 2002/0188696 A1 | 12/2002 | Ullmann et al. |
| 2003/0005430 A1 | 1/2003 | Kolessar |
| 2003/0023336 A1 | 1/2003 | Kreidler et al. |
| 2003/0028872 A1 | 2/2003 | Milovanovic et al. |
| 2003/0041125 A1 | 2/2003 | Salomon |
| 2003/0054757 A1 | 3/2003 | Kolessar et al. |
| 2003/0065777 A1 | 4/2003 | Mattila et al. |
| 2003/0066074 A1 | 4/2003 | Zimmerman et al. |
| 2003/0074400 A1 | 4/2003 | Brooks et al. |
| 2003/0093311 A1 | 5/2003 | Knowlson |
| 2003/0105769 A1 | 6/2003 | Harris |
| 2003/0115586 A1 | 6/2003 | Lejouan et al. |
| 2003/0177488 A1 | 9/2003 | Smith et al. |
| 2003/0229534 A1 | 12/2003 | Frangione et al. |
| 2003/0232649 A1 | 12/2003 | Gizis et al. |
| 2003/0233336 A1 | 12/2003 | Clark |
| 2003/0233461 A1 | 12/2003 | Mariblanca-Nieves et al. |
| 2004/0019675 A1 | 1/2004 | Hebeler, Jr. et al. |
| 2004/0039814 A1 | 2/2004 | Crabtree et al. |
| 2004/0068502 A1 | 4/2004 | Vogedes et al. |
| 2004/0078292 A1 | 4/2004 | Blumenau |
| 2004/0103142 A1 | 5/2004 | Becher et al. |
| 2004/0103143 A1 | 5/2004 | Chikada et al. |
| 2004/0117857 A1 | 6/2004 | Bisdikian et al. |
| 2004/0122679 A1 | 6/2004 | Neuhauser et al. |
| 2004/0177253 A1 | 9/2004 | Wu et al. |
| 2004/0186882 A1 | 9/2004 | Ting |

| | | |
|---|---|---|
| 2004/0198234 A1 | 10/2004 | Wacker et al. |
| 2004/0254887 A1 | 12/2004 | Jacoby |
| 2005/0009465 A1 | 1/2005 | Ross et al. |
| 2005/0052578 A1 | 3/2005 | Phillips et al. |
| 2005/0060542 A1 | 3/2005 | Risan et al. |
| 2005/0096986 A1 | 5/2005 | Taylor et al. |
| 2005/0148335 A1 | 7/2005 | Benco et al. |
| 2005/0176424 A1 | 8/2005 | Kumar et al. |
| 2005/0203798 A1 | 9/2005 | Jensen et al. |
| 2005/0204379 A1 | 9/2005 | Yamamori |
| 2005/0213511 A1 | 9/2005 | Reece, Jr. et al. |
| 2005/0213544 A1 | 9/2005 | Kikuchi et al. |
| 2005/0216509 A1 | 9/2005 | Kolessar et al. |
| 2005/0262251 A1 | 11/2005 | Klemets et al. |
| 2005/0289622 A1 | 12/2005 | Vanlerberghe et al. |
| 2006/0026162 A1 | 2/2006 | Salmonsen et al. |
| 2006/0077913 A1* | 4/2006 | McDermott et al. .......... 370/278 |
| 2006/0085812 A1 | 4/2006 | Shishegar et al. |
| 2006/0167971 A1 | 7/2006 | Breiner |
| 2006/0168250 A1 | 7/2006 | Feng et al. |
| 2006/0173974 A1 | 8/2006 | Tang |
| 2006/0277271 A1 | 12/2006 | Morse et al. |
| 2006/0277308 A1 | 12/2006 | Morse et al. |
| 2006/0294225 A1 | 12/2006 | Grecco et al. |
| 2007/0011040 A1* | 1/2007 | Wright et al. .................. 705/10 |
| 2007/0073799 A1 | 3/2007 | Adjali et al. |
| 2007/0106787 A1 | 5/2007 | Blumenau |
| 2007/0106792 A1 | 5/2007 | Blumenau |
| 2007/0129952 A1 | 6/2007 | Kenyon et al. |
| 2007/0192486 A1 | 8/2007 | Wilson et al. |
| 2007/0203791 A1 | 8/2007 | Kohl et al. |
| 2007/0274537 A1* | 11/2007 | Srinivasan ................... 381/94.3 |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0010133 A1 | 1/2008 | Pyhalammi et al. |
| 2008/0022294 A1 | 1/2008 | Perrin et al. |
| 2008/0091489 A1 | 4/2008 | LaRock et al. |
| 2008/0098432 A1 | 4/2008 | Hardacker et al. |
| 2008/0102884 A1 | 5/2008 | Song et al. |
| 2008/0126420 A1 | 5/2008 | Wright et al. |
| 2009/0203368 A1* | 8/2009 | Marsyla et al. ............... 455/418 |
| 2010/0299604 A1 | 11/2010 | Blumenau |

FOREIGN PATENT DOCUMENTS

| | | |
|---|---|---|
| GB | 2455965 | 7/2009 |
| JP | 2002051274 | 2/2002 |
| WO | 98/10349 | 3/1998 |
| WO | 98/26541 | 6/1998 |
| WO | 98/43455 | 10/1998 |
| WO | 00/04476 | 1/2000 |
| WO | 01/72058 | 9/2001 |
| WO | 2005046201 | 5/2005 |
| WO | 2005065159 | 7/2005 |
| WO | 2006/135205 | 12/2006 |
| WO | WO 2007126992 A2 * | 11/2007 |

OTHER PUBLICATIONS

REAL, "Helix Universal Server Administration Guide," Helix Universal Server Version 9.0, Chapter 10: Simulated Live Broadcasts, accessed via http://service.real.com/help/library/guides/helixuniversalserver/htmfiles/iqslta.htm (Retrieved from Internet on Mar. 9, 2007), 2002 (22 pages).

REAL, "Helix Universal Server Administration Guide," Helix Universal Server Version 9.0, Chapter 13: Multicasting, accessed via http://service.real.com/help/library/guides/helixproxyconfig/htmfiles/multicas.htm (Retrieved from Internet on Mar. 9, 2007), 2002 (6 pages).

REAL, "Helix Universal Server Administration Guide," Helix Universal Server Version 9.0, Chapter 8: Multicasts, accessed via http://service.real.com/help/library/guides/helixuniversalserver/htmfiles/multicst.htm (Retrieved from Internet on Mar. 9, 2007), 2002 (14 pages).

Qualcomm Incorporated, "Flo Technology Overview," Media Flo, http://www.qualcomm.com/common/documents/brochures/tech_overview.pdf, issued in 2007 (24 pages). (The year of publication is sufficiently earlier than the effective U.S. filing date and any foreign priority date.).

Hilbert et al., "An Approach to Large-Scale Collection of Application Usage Data Over the Internet," IEEE, 1998, 10 pages.

Vucetic et al., "Network Management Applications for Wireless Local Loop," Electrotechnical Conference, 1998, MELECON 98, 9th Mediterranean, vol. 2, May 18-20, 1998, pp. 787-791.

* cited by examiner

METHODS AND APPARATUS TO MONITOR MOBILE DEVICES

RELATED APPLICATIONS

This patent claims the benefit of U.S. provisional patent application No. 61/041,920, filed on Apr. 3, 2008, which is hereby incorporated by reference herein in its entirety.

FIELD OF THE DISCLOSURE

This disclosure relates generally to audience measurement and, more particularly, to methods and apparatus to monitor mobile devices.

BACKGROUND

Consuming media presentations (i.e., audio and/or video presentations) generally involves listening to audio information and/or viewing video information. Media presentations may include, for example, radio programs, music, television programs, movies, still images, web pages, video games, etc. Media-centric companies such as, for example, advertising companies, broadcast networks, etc. are often interested in the viewing and listening interests or habits of their audience to better market their products and/or to improve their media program offerings. Companies are often also interested in measuring media exposure that indicates when audience members were exposed to media presentations. A known technique often used to measure media consumption, exposure to media, and/or the number of audience members that consumed or were exposed to media involves awarding media consumption or exposure credit to a media presentation for each audience member that consumed or was exposed to the media presentation.

DETAILED DESCRIPTION

Figure 1:
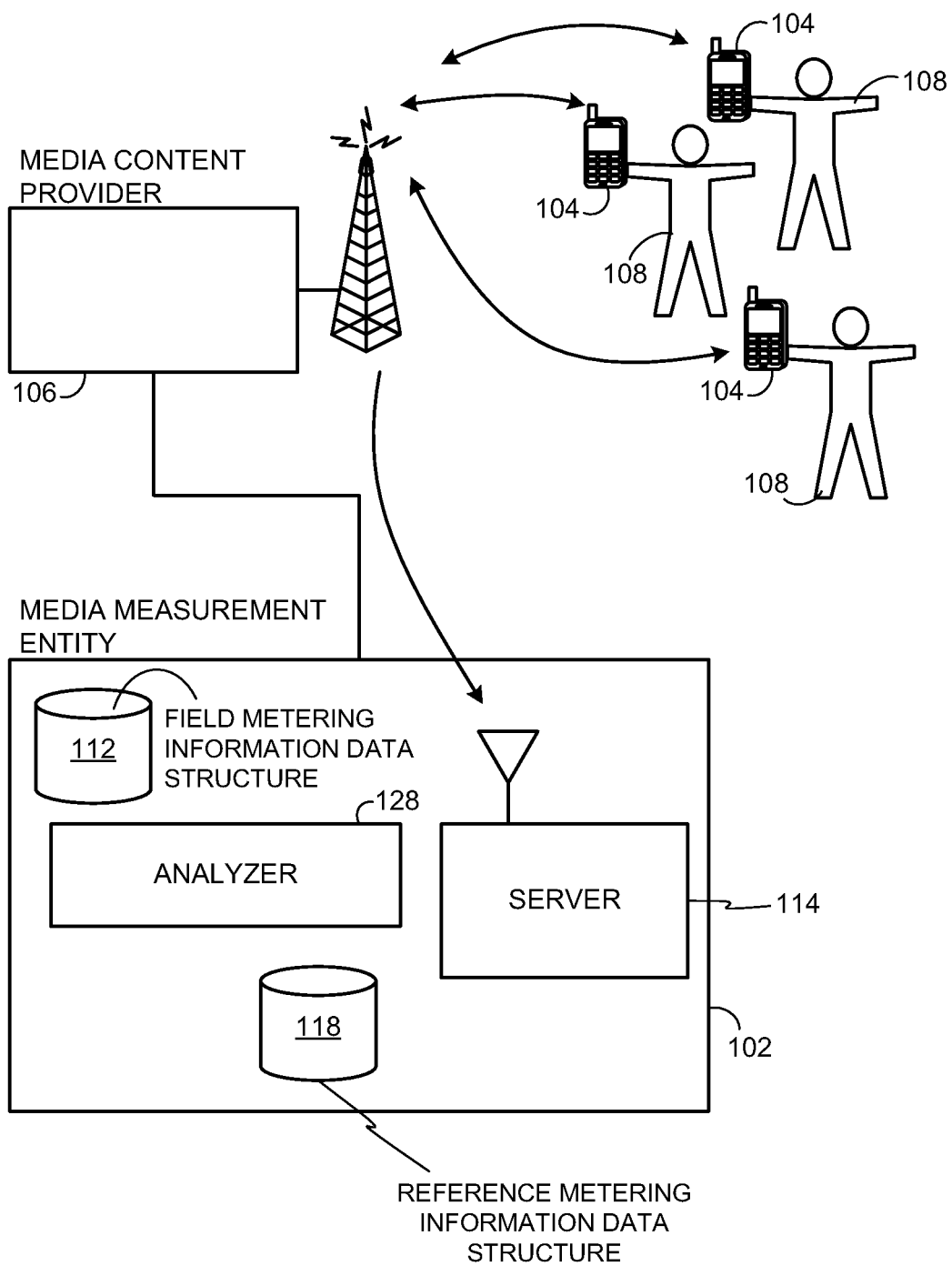
FIG. 1 is a block diagram illustrating an example media measurement entity that is configured to analyze metering information generated by a plurality of mobile communication devices configured to receive media content from a media content provider.

The example methods, systems, and apparatus described herein may be used to meter media content presented and/or stored on a mobile communication device. An example method of monitoring media presented by a mobile communication device involves monitoring media content presented by the mobile communication device, collecting media metering information associated with the presented media content, and communicating the media metering information to a metering entity to analyze media consumption or media exposure of audience members.

In accordance with a described example, an example method to monitor media presented via a wireless communication device involves performing an optical recognition process on an image displayed on the wireless communication device. In addition, the example method involves identifying first information representative of a feature associated with at least one of a media channel or a media network based on the optical recognition process. The first information is compared to second information in an electronic program guide and when the first information matches the second information, a media program identifier in the electronic program guide is identified based on a time when the image was displayed on the wireless communication device.

In accordance with another described example, an example apparatus to monitor media presented via a wireless communication device includes a processor and a memory communicatively coupled to the processor and having instructions stored thereon that, when executed, cause the processor to perform an optical recognition process on an image displayed on the wireless communication device. The instructions also cause the processor to identify first information representative of a feature associated with at least one of a media channel or a media network based on the optical recognition process and compare the first information to second information in an electronic program guide when the first information matches the second information, the instructions cause the processor to identify a media program identifier in the electronic program guide based on a time when the image was displayed on the wireless communication device.

In accordance with another described example, an example method to monitor media presented via a wireless communication device involves receiving first and second collected signatures corresponding to a first media presentation presented via a wireless communication device and comparing the first collected signature to a first reference signature corresponding to a second media presentation. When the first collected signature does not substantially match the first reference signature, the second collected signature is compared to a second reference signature corresponding to the second media presentation and a third reference signature corresponding to a third media presentation. The method also involves determining that the first media presentation is associated with the second media presentation based on the second collected signature being relatively more similar to the second reference signature than to the third reference signature.

In accordance with another described example, an example apparatus to monitor media presented via a wireless communication device includes a processor and a memory communicatively coupled to the processor and having instructions stored thereon that, when executed, cause the processor to receive first and second collected signatures corresponding to a first media presentation presented via the wireless communication device and compare the first collected signature to a first reference signature corresponding to a second media presentation. When the first collected signature does not substantially match the first reference signature, the instructions cause the processor to compare the second collected signature to a second reference signature corresponding to the second media presentation and a third reference signature corresponding to a third media presentation. The instructions also cause the processor to determine that the first media presentation is associated with the second media presentation based on the second collected signature being relatively more similar to the second reference signature than to the third reference signature.

In accordance with another described example, an example method to monitor media presented via a wireless communication device involves receiving a first collected signature corresponding to a first media presentation and receiving a second collected signature corresponding to a second media presentation. The second media presentation is an altered version of the first media presentation. The example method also involves comparing the first collected signature to a first reference signature corresponding to a third media presentation and determining that the first collected signature is associated with the third media presentation based on a substantial match between the first collected signature and the first reference signature. In addition, the example method involves comparing the second collected signature to a second reference signature corresponding to the third media presentation and a third reference signature corresponding to a fourth media presentation and determining that the second collected signature is associated with the third media presentation based on the second collected signature being relatively more similar to the second reference signature than to the third reference signature.

In accordance with another described example, an example apparatus to monitor media presented via wireless communication devices includes a processor and a memory communicatively coupled to the processor and having instructions stored thereon that, when executed, cause the processor to receive a first collected signature corresponding to a first media presentation and a second collected signature corresponding to a second media presentation. The second media presentation is an altered version of the first media presentation. The instructions also cause the processor to compare the first collected signature to a first reference signature corresponding to a third media presentation and determine that the first collected signature is associated with the third media presentation based on a substantial match between the first collected signature and the first reference signature. In addition, the instructions cause the processor to compare the second collected signature to a second reference signature corresponding to the third media presentation and a third reference signature corresponding to a fourth media presentation and determine that the second collected signature is associated with the third media presentation based on the second collected signature being relatively more similar to the second reference signature than to the third reference signature.

In accordance with another described example, an example method to monitor media delivered over wireless communication networks involves operating first and second wireless communication device terminals, wherein the first wireless communication device terminal includes a first media decoder configured to decode a first media encoding format, and wherein the second wireless communication device terminal includes a second media decoder configured to decode a second media encoding format. The example method also involves receiving a first media presentation via the first wireless communication device terminal and a second media presentation via the second wireless communication device terminal. In the example method, the first media presentation is encoded using the first media encoding format and the second media presentation is encoded using the second media encoding format. In addition, the first and second media presentations include substantially similar media content. The example method also involves generating a first reference signature of the first media presentation and a second reference signature of the second media presentation. In addition, the first reference signature is stored in association with first device identifier information indicative of the first wireless communication device terminal, and the second reference signature is stored in association with second device identifier information indicative of the second wireless communication device terminal.

In accordance with another described example, an example system to monitor media delivered over wireless communication networks includes first and second wireless communication devices. In the example system, the first wireless communication device includes a first media decoder configured to decode a first media encoding format, and the first wireless communication device terminal is configured to receive a first media presentation encoded using the first media encoding format and generate a first reference signature of the first media presentation. In the example system, the second wireless communication device includes a second media decoder configured to decode a second media encoding format, and the second wireless communication device terminal is configured to receive a second media presentation encoded using the second media encoding format and generate a second reference signature of the second media presentation. In the example system, the first and second media presentations include substantially similar media content. The example system also includes a database to store the first reference signature in association with first device identifier information indicative of the first wireless communication device terminal and store the second reference signature in association with second device identifier information indicative of the second wireless communication device terminal.

In some example implementations, the example methods, systems, and apparatus described herein monitor media content presented and/or stored on a mobile communication device by generating metering information based on the content received by and/or stored in a mobile communication device along with time/date stamp information indicative of when the content was received and/or presented via the mobile communication device. The metering information can subsequently be analyzed at the mobile communication device and/or at a central server to identify the media content and/or other characteristics associated with the media content such as television channel number, channel name, program name, etc.

In some example implementations, to analyze the metering information generated by mobile communication devices (i.e., field-generated metering information), a server is configured to emulate a plurality of mobile communication devices to generate reference metering information that can be compared to the field-generated metering information to identify media received by and/or presented by field mobile communication devices.

In the illustrated examples described herein, field mobile communication devices are devices used by panel members that have agreed to participate in a metering program to identify media contents or types of media that mobile subscribers consume. Also, emulated mobile communication devices are devices emulated by a server to generate reference metering information. As discussed below, a server is used to emulate different types of field mobile communication devices (e.g., field mobile communication devices from different manufacturers, having different network capabilities, having different media decoders or media decoding capabilities, etc.) because reference metering information may differ from one field device to another even when the media content received by two different field devices is generally the same. For example, to ensure that each mobile device can decode and present media content, a service provider may transcode media content to be decodeable using the capabilities (e.g., media decoders) of mobile devices from respective manufacturers or having respective operating systems, applications, media playback applications, media decoders, etc. For instance, a Motorola® mobile device may receive media content from a service provider that is encoded using one encoding standard while a Nokia® mobile device may receive the same media content (e.g., the same video clip) from the same service provider that is encoded using a different encoding standard. While the media content is essentially the same, the digital information making up the media content may be different due to the different encoding standards and, thus, any respective hashes generated from the media contents on each mobile device will differ even though the media contents are essentially the same. Thus, to be able to analyze hashes from respective field mobile communication devices, the server is configured to emulate each type of mobile communication device to generate reference metering information corresponding to each type of mobile communication device.

Media content can include graphics, still images, video, television, wallpapers, audio, software or other media that may be delivered over a wired or wireless network in analog or digital form.

Metering information may include signatures or hashes of the media content itself or other identifier information related to the media content including, for example, file names, television channel numbers, television network names, internet web page addresses (e.g., uniform resource locators (URL's)), program names, etc. In some example implementations, metering information may include raw pixel data of a single frame (e.g., screen shots of presented video or television content), an average of the color values of a graphic image (still or video image), a digital sample of audio content, and/or signature or hash information generated based on any of these.

Generating a hash or a hash code refers to the technique of generating a string of letters, numbers, or other symbols based on characteristics of input data. Media content or captured elements of media content are two examples of input data. The method for generating a hash code is implemented to provide the code with unique properties that can be used to identify respective media contents. In some example implementations, a hash technique may be implemented so that two graphical images that are identical will result in precisely the same or substantially similar hash codes, in which case the hash codes are exact (or near exact) hashes. In other example implementations, a hashing technique may be implemented so that two graphical images of the same subject matter but of different scales or standards (e.g., the number of pixels required to display them) will result in hash codes that are closer (or more similar) to one another than hash codes for two unrelated graphical images, in which case the hash codes are similarity hashes.

A content source can be a content provider (e.g., a wireless service provider, a mobile phone television content provider, etc.), a computer, a server, a broadcast system, a mobile phone, or any other device or system that may store and send content to a receiving device.

As discussed below, mobile communication devices can be metered using event capture adapters that translate events from mobile device applications to metering information that can be used to identify media contents received by and/or presented via the mobile devices.

Meters installed on mobile communication devices and used to meter media contents are implemented using a platform adapter, which is used to access different applications or contents on a mobile device to translate information between the meter installed on the device and an underlying operating system.

In the illustrated examples described herein, an electronic program guide refers to the graphical image, sets of images, audio, teletext, text, metadata or other conveyance that provides additional information about delivered media content or media content available for delivery to mobile communication devices. In some example implementations, program guides may include on-screen television listings that provide information such as the start times, time durations, end times, and titles of one or more television shows. Further example implementations of program guides may further include text description(s) of the television show(s).

FIG. 1 is a block diagram illustrating an example media measurement entity 102 that is configured to analyze field metering information (or panel metering information) generated by a plurality of mobile communication devices 104 (e.g., wireless communication devices) configured to receive media content from a media content provider 106. The mobile communication devices 104 may be, for example, cellular/wireless telephones, pagers, any cellular/wireless communication device (e.g., handheld cellular/wireless communication devices), personal digital assistants ("PDA's"), handheld wireless computers, wireless gaming devices, a two-way user-interactive wireless communication device, or any other wireless communication device that may be used to receive media content from the media content provider 106 and present the received media content. In some example implementations, one or more mobile communication devices 104 may be implemented using a cellular/wireless mobile telephone having a display, a speaker, and/or a headset jack for presenting media content to a user. As used herein, a cellular communication device is a two-way user-interactive device that communicates with one or more transceiver towers having respective wireless telecommunication base stations connected thereto to exchange information (e.g., voice information, data, control information, etc.) with a telecommunications system. The transceiver towers are located in respective cell areas or cell sites throughout a geographic area. The cellular communication device can be configured to work in connection with any wireless telecommunication standard including any analog and/or digital communication standards such as, for example, Advanced Mobile Phone System (AMPS), Code Division Multiple Access (CDMA), Time Division Multiple Access (TDMA), Global System for Mobile communications (GSM), Enhanced Data rates for Global Evolution (EDGE), General Packet Radio Service (GPRS), Personal Digital Communications (PDC), Personal Communication Services (PCS), Personal Handyphone System (PHS), etc.

The media content may include, for example, video content (e.g., television programming, movies, animations, MPEG-2, MPEG-4, Windows Media Video ("WMV"), QuickTime® Movie, Real Video, etc.), audio content (e.g., radio programming, Internet radio, satellite radio, MP3, Windows Media Audio ("WMA"), Real Audio, etc.), video game content, graphics content (e.g., electronic art, photos, pictures, etc.), Internet information (e.g., web pages, rich site summary ("RSS"), text notifications, etc.), interactive media content, or any other content that may be delivered by the media content provider 106. The media content may include, for example, entertainment content, educational content, news, advertising, demographics-based targeted advertising, geographic-based targeted advertising, interest-based targeted advertising, etc. The media content provider 106 may deliver the media content in compressed and/or uncompressed formats and in encrypted and/or unencrypted formats. Although one media content provider (e.g., the media content provider 106) is shown, any quantity of media content providers may deliver media content to the wireless communication devices 104, and the wireless communication devices 104 are configured to generate panel metering information associated with media content delivered by any of the media content providers.

To deliver media content to different types of mobile communication devices (e.g., mobile communication devices made by different manufacturers, having different media decoders or decoding capabilities, having different hardware capabilities, having different transport protocol capabilities, etc.), the media content provider 106 may include a transcoder or media gateway to convert media contents between different transport protocols and/or between different media encodings. In this manner, each type of mobile communication device can present the same subject matter of the media content available for delivery by the media content provider 106 even when the different mobile communication devices have different communication capabilities, different media decoders or decoding capabilities, and/or different hardware capabilities (e.g., different screen resolutions, different audio systems, etc.).

Field metering information may be generated by capturing excerpts of media (e.g., screen shots, audio samples, etc.) and processing those media excerpts. For example, a meter may capture a screen shot of a video and use optical character recognition to determine the channel number or channel name displayed in a portion of the video screen (e.g., along the lower boundary of the screen or in a corner of the screen). In some example implementations, the optical recognition process can be used to identify characters or features on a selected portion of a screen without operating on non-selected portions of the screen. In other example implementations, field metering information may be generated by inspecting files stored on a mobile communication device to identify particular media contents or types of media contents (e.g., identify all .mp3 files or .mov files stored on a device).

In some example implementations, panel metering information may also include information indicative of web browser usage (e.g., web sites visited) and interactive application usage (e.g., products investigated, purchases made, etc.). Example interactive usage that can be metered includes detecting websites visited by a user. As discussed below, websites may be detected by scanning through web browser cache files.

The media measurement entity 102 may generate reports that include media consumption information, media exposure information, media ratings, perceived preferences of panel members 108, wireless communication device usage information, etc. The media measurement entity 102 may deliver the reports to the media content provider 106 and/or any other entity (e.g., a wireless communications service provider 120, media content producers, advertising companies, etc.) requesting such information.

As indicated in FIG. 1, the media content provider 106 delivers media content to the mobile communication devices 104, and the mobile communication devices 104, in turn, communicate field metering information to the media content provider 106 and/or directly to the media measurement entity 102. When an audience member or a panel member 108 selects particular media content via a respective mobile communication device 104, the mobile communication device 104 requests the selected media content from the media content provider 106. The media content provider 106, in turn, delivers the requested media content to the requesting mobile communication device 104 using a unicast communication. Additionally or alternatively, the media content provider 106 may continuously deliver a plurality of media content using media broadcast or multicast technologies. The mobile communication devices 104 may then select a particular media program (e.g., a broadcasted or multicasted media program) to decode in response to a media selection made by the panel member 108.

A broadcast communication delivers the same data to all of the mobile communication devices 104 that are within range to receive communication signals from a cell tower or a plurality of cell towers used to transmit the broadcast communication. A multicast communication delivers the same data to selected ones of the mobile communication devices 104 or a selected subset of the mobile communication devices 104 that are within range to receive communication signals from a cell tower or a plurality of cell towers used to transmit the multicast communication. For example, where two of the mobile communication devices 104 are within range of receiving communications from a cell tower used to transmit multicast data and only one of the mobile communication devices 104 is selected (e.g., based on pay-per-view, subscription based selection, etc.) to receive the multicast data, the selected mobile communication device 104 will be able to receive and present the media content in the multicast data while the non-selected mobile communication device 104 will not be able to receive and present the media content. The mobile communication devices 104 selected to receive the multicast communication may be specified in the multicast data stream using one or more types of identification information including, for example, internet protocol (IP) addresses, electronic serial numbers (ESN's), subscriber identity module (SIM) card identifiers, phone numbers, media terminal identifiers, etc.

In some example implementations, each of the mobile communication devices 104 or some of the mobile communication devices 104 may be configured to establish a back channel link (e.g., a return channel, a reverse channel, a return path, etc.) with the media content provider 106 or any other entity associated with transmitting media content or metering. A back channel link may be used to exchange information between a mobile communication device 104 and another entity. The information may include control commands communicated by the media content provider 106 or any other entity to the mobile communication device 104 to control (e.g., start, stop, pause, skip, fast forward, rewind, etc.) a presentation of media content. The information may also include interactive commands or other interactive data exchanged between the mobile communication device 104 and the media content provider 106. The information may also include targeted advertising delivered by the media content provider 106 or another entity to a mobile communication device 104 based on, for example, demographic information associated with a user of the mobile communication device 104 or a geographic location of the mobile communication device 104. The example apparatus and methods described herein may also be configured to monitor information communicated via the back channels associated with the mobile communication devices 104 to generate panel metering information. In some example implementations, the information described above as being communicated via the back channel can alternatively or additionally be communicated via a forward link of a broadcast, a multicast, or a unicast communication and can be monitored on the forward link to generate metering information.

The media content provider 106 may use one or more communication standards or protocols to deliver media content. For example, the media content provider 106 may deliver the media content using a plurality of frequency bands, sender IP addresses, etc. to which the wireless communication devices 104 may tune. An example media delivery technology that the media content provider 106 may use to deliver media includes Digital Video Broadcasting for Handheld devices technology ("DVB-H"), which is defined by the Telecommunications Industry Association ("TIA®") in standard TIA-TR-47.2—"Terrestrial Mobile Multimedia Multicast based on DVB-H Technology." Another example media delivery technology that the media content provider 106 may use to deliver media includes a forward link only ("FLO") technology that is defined by the TIA® trade association in standard TIA-TR47.1—"Terrestrial Mobile Multimedia Multicast based on Forward Link Only Technology." Example media content delivery technologies and services based on FLO technology are developed and sold by MediaFLO USA, Inc. of San Diego, Calif. In other example implementations, the media content provider 106 may deliver the plurality of media content using other communication standards including, for example, a time division multiple access ("TDMA") communication protocol, the global system for mobile ("GSM®") communication protocol, a code division multiple access ("CDMA") communication protocol, a wideband CDMA communication protocol, a WiFi protocol, a WiMAX® protocol, a 3G protocol, etc.

In the illustrated example, a server 114 of the media measurement entity 102 receives field metering information from the field mobile communication devices 104 and stores the field metering information in a field metering information data structure 112 and subsequently analyzes the reference metering information as described below. In some example implementations, the server 114 is configured to receive field metering information from the field mobile communication devices 104 based on rules. Some rules may be related to network loading. For example, a rule may specify that the server 114 is only to receive field metering information between the hours of midnight and three o'clock in the morning when network activity is least because most people are sleeping. Other rules may be related to the content being monitored. For example, a rule may specify that field metering information associated with a very popular sporting event (e.g., the Super Bowl football game) should be communicated almost immediately to the server 114 to facilitate providing quick media ratings information to advertisers, programming providers, etc. Other rules may be related to a particular mobile communication device. For example, if a mobile communication device is used heavily by its owner at particular times of day, a rule may indicate not to communicate field metering information to the server 114 during those times. Other rules may be related to the type of field metering information involved. For example, field metering information made up of relatively little information (e.g., channel numbers, metadata, etc.) may be communicated at any time, while field metering information including relatively more data (e.g., video screen shots) may be stored relatively longer on the field mobile communication device for download during off-peak network hours. Other rules may specify that field metering information should only be communicated to the server 114 when a storage buffer on the field mobile communication device 104 is full.

The media measurement entity 102 may use reference metering information to analyze the panel member metering information. Reference metering information includes metering information of all or a subset of all the media content delivered by the media content provider 106. For example, for a given time period (e.g., a 24-hour period, a week period, etc.), the media measurement entity 102 may meter a different (or same) subset of media content than that metered during other previous or subsequent time periods. To generate reference metering information, the server 114 is configured to emulate a plurality of mobile communication devices to receive media content that is available at the media content provider 106 for download to the field mobile communication devices 104. In the illustrated example, the server 114 also implements a meter (e.g., a meter similar to the meter 402 of FIG. 4) for each of the emulated mobile devices. Each meter is configured to monitor and meter all or a portion of the media content delivered by the media content provider 106. For instance, if the media content provider 106 broadcasts or multicasts a plurality of media programs simultaneously via a plurality of channels (e.g., frequency channels, time slot channels, code division channels, etc.), the meters of the server 114 monitor all of the channels and generate and/or collect the reference metering information associated with the different media contents. In the illustrated example, the server 114 is configured to store the reference metering information in a reference metering information data structure 118 for subsequent use to analyze the reference metering information generated by the wireless communication devices 104. The reference metering information data structure 118 may be external or internal to the server 114. The example server 114 is described in greater detail below in connection with FIG. 6.

The media measurement entity 102 may use various methods to select the panel members 108 to participate in a market research program. In some example implementations, all wireless communication devices used by subscribers of the media content provider 106 may generate and/or collect panel metering information. In another example implementation, the media measurement entity 102 and/or the media content provider 106 may randomly select a subset of the wireless communication devices 104 to continuously or at predefined times generate panel metering information. Randomly selected subsets of the wireless communication devices 104 may be preselected at predefined intervals (e.g., every day, every 90 days, etc.). Alternatively or additionally, the media measurement entity 102 (and/or a wireless network service provider) may advertise the metering program directly to users of the mobile communication devices 104, which may include subscribers of the media content provider 106. For example, the media measurement entity 102 may advertise the metering program by sending messages (e.g., via e-mail, via a web page, via wireless application protocol ("WAP"), via short messaging service (SMS), etc.) to the mobile communication devices 104 including a selectable option indicating a person's consent to participate in the metering program.

When a person provides their approval to participate in the metering program, the person becomes one of the panel members 108 and that person's corresponding wireless communication device 104 is then configured to generate and/or collect panel metering information whenever the panel member 108 consumes media or is exposed to media presented via the wireless communication device 104. For example, the media measurement entity 102, the media content provider 106, and/or the wireless communications service provider 120 may transmit metering software (e.g., the meter 402 of FIG. 4) to the wireless communication device 104 to enable metering. Alternatively, the metering software and/or hardware may be pre-installed on the wireless communication device 104 so that the media measurement entity 102 and/or the media content provider 106 (and/or a wireless network service provider) need only communicate to the wireless communication device 104 a message instructing the mobile communication device 104 to enable the metering software and/or hardware. The metering software and/or hardware may be configured to monitor all of the media content presented by the wireless communication device 104 or only a subset of media content. For instance, the metering software may be configured to monitor media content during particular times, media content delivered via particular channels, and/or only particular media content programming. In the illustrated examples described herein, the media measurement entity 102 and/or the media content provider 106 (and/or a wireless network service provider) may communicate rules to the mobile communication devices 104 indicating what media content to meter, when to meter, and what type of metering information to generate.

Figure 6:
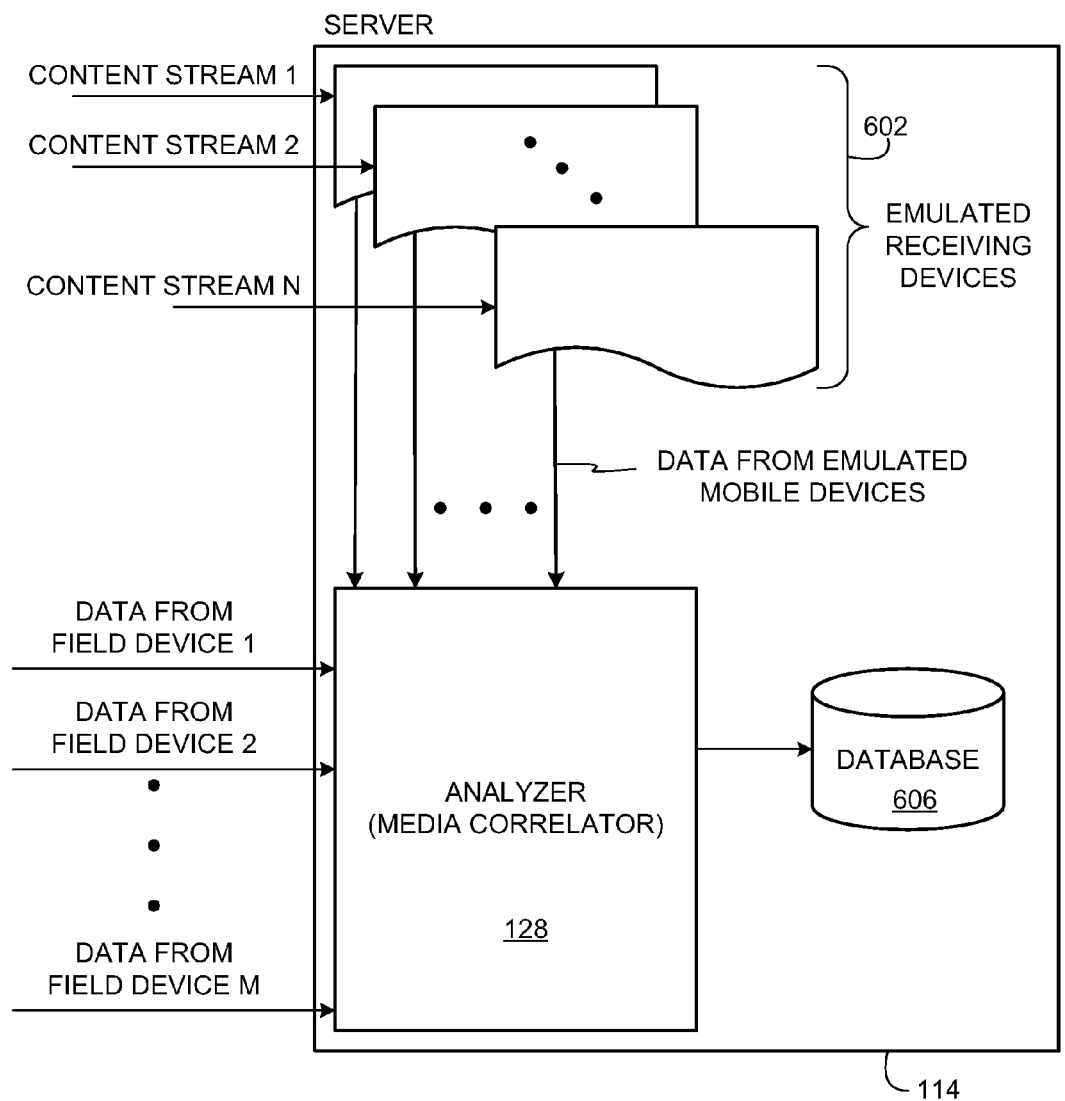
FIG. 6 depicts a block diagram of the server of FIG. 1.

To process the metering information (e.g., the panel metering information, the reference metering information, etc.), the media measurement entity 102 is provided with an example analyzer 128. The analyzer 128 is configured to retrieve metering information from the metering information data structures 112 and 118. In some example implementations, the analyzer 128 may also be configured to perform analyses in connection with demographic information associated with the panel members 108. In the illustrated example, the example analyzer 128 is configured to perform analyses on any one or more types of metering information to generate analysis results indicative of media consumption and/or media exposure. In addition, the analyzer 128 may be configured to generate reports based on the analysis results. In some example implementations, the analyzer 128 may be implemented in the server 114 as shown in FIG. 6.

Figure 2:
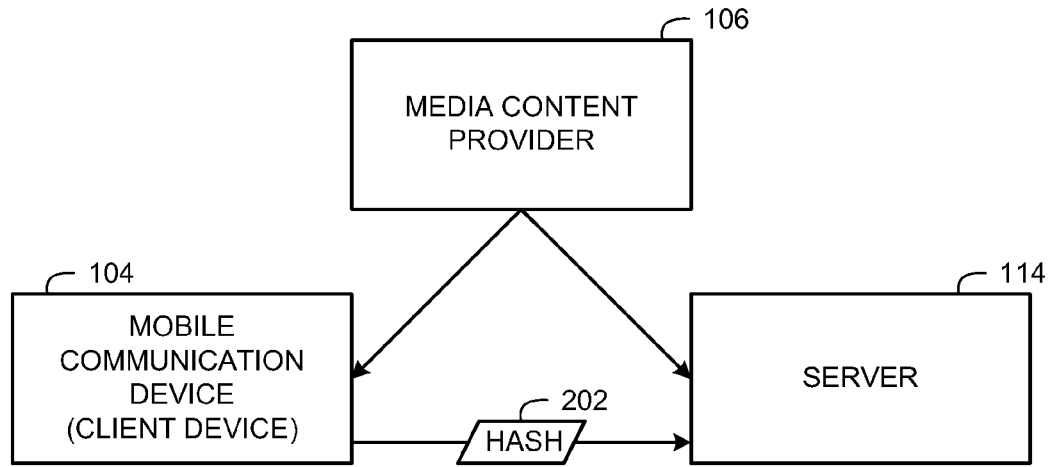
FIG. 2 depicts an example system configuration in which a server of FIG. 1 receives hashes from mobile communication devices of FIG. 1 for subsequent analyses.

FIG. 2 depicts an example system configuration in which the server 114 of FIG. 1 receives hashes from the field mobile communication devices of FIG. 1 for analysis. In the illustrated example of FIG. 2, the field mobile communication device 104 may compute a hash 202 based on elements or features extracted from or detected in media content delivered to the device 104. The hash 202 may be an exact (or near-exact) hash including a signature (e.g., an audio signature, a video signature, a still image signature, etc.), a sample or excerpt of media content, or other information associated with the media content. For example, the hash may be representative of a website address (e.g., a URL). An exact hash (or near-exact hash) is one that may be compared to reference hashes to detect exact or substantially exact matches with the reference hashes. That is, when a comparison between an exact (or near-exact) hash and a reference hash indicates an exact or substantially exact match, this means that a media content can be identified based on the exact match. In the illustrated examples described herein, a substantially exact match occurs when a difference between a collected hash or signature and a reference hash or signature is within a threshold difference or threshold error.

Some hashes may be a concatenation of a plurality of information about a media content presentation. For instance, an image hash may be computed based on separate hashes, each associated with a different color component of an image. For example, an image hash may be computed as follows: ImageHash=x.y.hash(red).hash(blue).hash(green)=single large integer, where x is the width and y is the height of an image and hash(color) is a one-way hash function. Such a hash function can be used across different mobile device platforms and can be used to detect whether differently sized images are used as input data. For a 128-bit hash, each x,y pixel has 16 bits of color information, each hash(color) is CRC32, and the resulting hash value is a 128-bit integer. For a 64-bit hash, each x,y pixel has 11 bits of color information and each hash(color) is stored in the lower 14 bits of CRC16.

In some example implementations, the mobile communication device 104 can be configured to additionally or alternatively compute similarity hashes based on received media content. Similarity hashes do not require finding an exact or near-exact match with a reference hash (as discussed above in connection with exact or near-exact hashes) to identify the media content with which the similarity hash is associated. In the illustrated examples described herein, a similarity hash is used to identify media content by determining that the similarity hash is more similar to one reference hash or signature than to another reference hash or signature. Similarity hashes can be used to facilitate identifying media content that has been duplicated, copied, or otherwise modified from its original version so that even when media content is not provided directly from legitimate content providers (e.g., the content provider 106) and may be distorted or altered, the media content may still be metered. For example, when a legitimate copy of a music video is copied or modified, certain characteristics of the copy or modified version may be different from the original legitimate copy. Thus, an exact hash of the legitimate copy would not exactly or substantially match a hash of the modified copy. Therefore, to identify the media content of a modified copy using hashes, the example methods and apparatus described herein can be used to generate similarity hashes, which are used to identify media content by determining how closely similarity hashes of field metering information are to exact hashes of reference metering information. For example, if a similarity hash is more similar to an exact hash of a first media content than an exact hash of a second media content, then it may be determined that the similarity hash corresponds to a copy of or modified version of the first media content and, thus, the first media content can be credited (e.g., with an exposure credit) as being (or having been) viewed or consumed by a panel member.

Similarity hashes can also advantageously be used to meter media content transcoded for different mobile communication devices having different media presentation capabilities. For example, an exact (or near-exact) hash of streaming media content transcoded for a device associated with a relatively low data delivery bit rate and relatively small display resolution will not match an exact (or near-exact) hash of the same streaming media content transcoded for a device associated with a higher data delivery bit rate. This is because there are differences in the data between the differently transcoded media contents due to the differences in the transcoding processes. However, the media contents will be generally similar so that similarity hashes can be used for purposes of identifying them.

An example manner of generating a similarity hash for an image involves hashing global parameters or features of the overall image in connection with specific parameters or features of the image. An overall global parameter may be an average of a color component in the overall image and a specific parameter may be an average of the color component in a particular macroblock of the image where the image is formed of a plurality of macroblocks. An example process for generating a similarity hash may be as follows: ImageHash=x.y.SimilarityHash1(Global Param 1) . . . SimilarityHashN(GlobalParamN).SimilarityBlockHash(Block 1) . . . SimilarityBlockHash(Block N). In such a process, SimilarityHash1 . . . SimilarityHashN represent different functions operating on global parameters of the entire image, and SimilarityBlockHash may or may not be one of the functions used in SimilarityHash1 . . . SimilarityHashN.

In some example implementations, when generating exact or near-exact hashes, a mobile device may be configured to only generate one exact hash because an exact or substantially exact match can be used to definitively identify respective media content. Alternatively, when generating similarity hashes, a mobile device may be configured to generate several similarity hashes for a particular media content because similarity hashes typically do not exactly match references hashes. Thus, to increase the certainty that a similarity hash is close enough or similar enough to a reference hash (relative to another reference hash) to identify a media content corresponding to the reference hash as having been consumed, several similarity hashes generated based on particular media content can be used to ensure that all of them are relatively close enough to reference hashes of a reference media content. For example, several similarity hashes may be made of different characteristics of media content including, for example, different color components, different areas of a display screen, contrast characteristics, etc. To determine closeness between similarity hashes and reference hashes, comparisons may be based on Euclidean distance calculations, Markov model calculations, or any other techniques suitable for determining distances or dissimilarity deviations between different similarity hashes and reference hashes.

In addition to a hash or instead of a hash, the field mobile communication device 104 may generate other types of metering information including, for example, file names of media files stored on the device 104, metadata, etc.

As shown in FIG. 2, the mobile communication device 104 communicates the hash to the server 114. For example, implementations in which computational performance of the field mobile communication device 104 is limited, the device 104 may be configured to communicate the hash 202 to the server 114. In this manner, the server 114 can identify corresponding metadata and, in some instances, communicate the identified metadata back to the field mobile communication device 104.

In some example implementations, the field mobile communication device 104 may perform character and/or feature recognition on elements extracted from the media content it receives to create metadata about the content. A character recognition process (e.g., an optical character recognition (OCR) process) may be used to identify channel numbers or channel names displayed on a screen. A feature recognition process may be used to recognize, for example, logos displayed on a screen to identify, for example, a channel network, a television program, etc. This metadata may be stored on the field mobile communication device 104 and/or may be communicated as metering information to the server 114. The types of metadata that the field mobile communication device 104 creates may include, for example, channel number, program title, subtitle text, closed-caption text, lyrics, text derived from graphically-depicted text in the media content, program description, or other data that is relevant to the particular media content.

Figure 3:
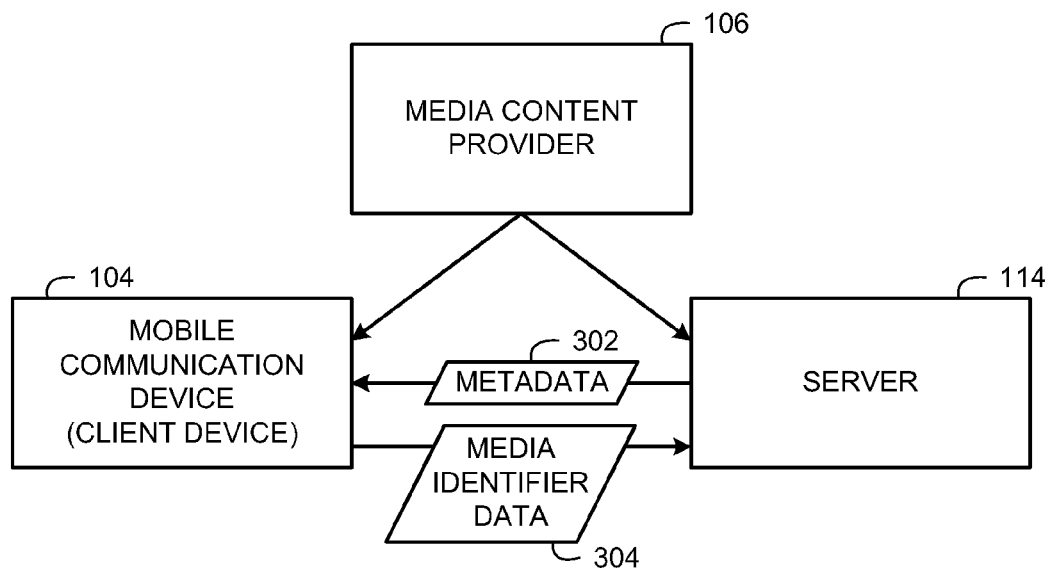
FIG. 3 depicts an example system configuration in which the mobile communication devices of FIG. 1 analyze media presented via the mobile communication devices to generate media identification data and communicate the media identification data to the server of FIG. 1.

FIG. 3 depicts another example system configuration in which the field mobile communication devices 104 of FIG. 1 analyze media provided by the media content provider 106 (and decoded by the field mobile communication devices 104) to generate media identification data and communicate the media identification data to the server 114 of FIG. 1. As shown in FIG. 3, the server 114 may provide metadata 302 to the field mobile communication device 104. This metadata 302 may include electronic program guide information that the field mobile communication device 104 can compare to the metadata it generates internally using, for example, a character/feature recognition process. The field mobile communication device 104 may be configured to use program guide metadata to determine the identity of presented media content. For example, the field mobile communication device 104 can match a channel number (obtained using the character recognition process) associated with the presented media content to a channel number in the program guide metadata and retrieve a corresponding program title from the program guide metadata that is indicated as scheduled during a time at which the field mobile communication device 104 presented the media content. The field mobile communication device 104 may store the program title for subsequent communication to the server 114 as media identifier data 304. The media identifier data 304 may include information in addition to or instead of program title information including, for example, media content network name, media type (e.g., news, sports, sit-com, etc.). In some example implementations, this process of matching locally generated metadata with program guide metadata may be used to display information about the media content being presented including, for example, program title information.

In some instances, electronic program guides may include information that is inaccurate or incorrect. Under such circumstances, identifying a program title based on channel number and schedule time as discussed above could lead to inaccurate metering results. For example, if the electronic program guide data indicates that a particular show is scheduled on a particular channel at a particular time, but the media content provider 106 delivers a different show on that channel at that time, the metering information contains the wrong program title as having been presented via the field mobile communication device 104. To minimize or prevent generating such incorrect metering results, one or more reference mobile devices can be emulated at the media measurement entity 102 as discussed below in connection with FIG. 6. The reference mobile device(s) can collect reference metadata (e.g., channel numbers, network name, program titles, closed-caption text, or any other type of metadata) associated with content delivered by media content providers on different channels at different times and store the reference metadata (e.g., reference metering information) in the reference metering information data structure 118 of FIG. 1. In this manner, the field mobile communication devices 104 can collect channel numbers with associated date-time stamps indicative of when the field mobile communication devices 104 presented were tuned to those channels and communicate those channel numbers with associated date-time stamps to the media measurement entity 102. The analyzer 128 can compare the received field-generated metering information with the reference metadata to identify media content presented by the field mobile communication devices 104. For example, the reference metadata could include channel numbers along with respective program titles or other program identifiers for different schedule times.

In some example implementations, the server 114 can record portions of media content delivered to the reference mobile device(s), and persons can visually inspect the recorded portions to manually confirm or provide the identity (e.g., program title) of the media content and store the identity in the reference metadata for each presented media content. To conserve storage space, the server 114 can be configured to record the media content at relatively low resolutions and/or frame rates.

Figure 4:
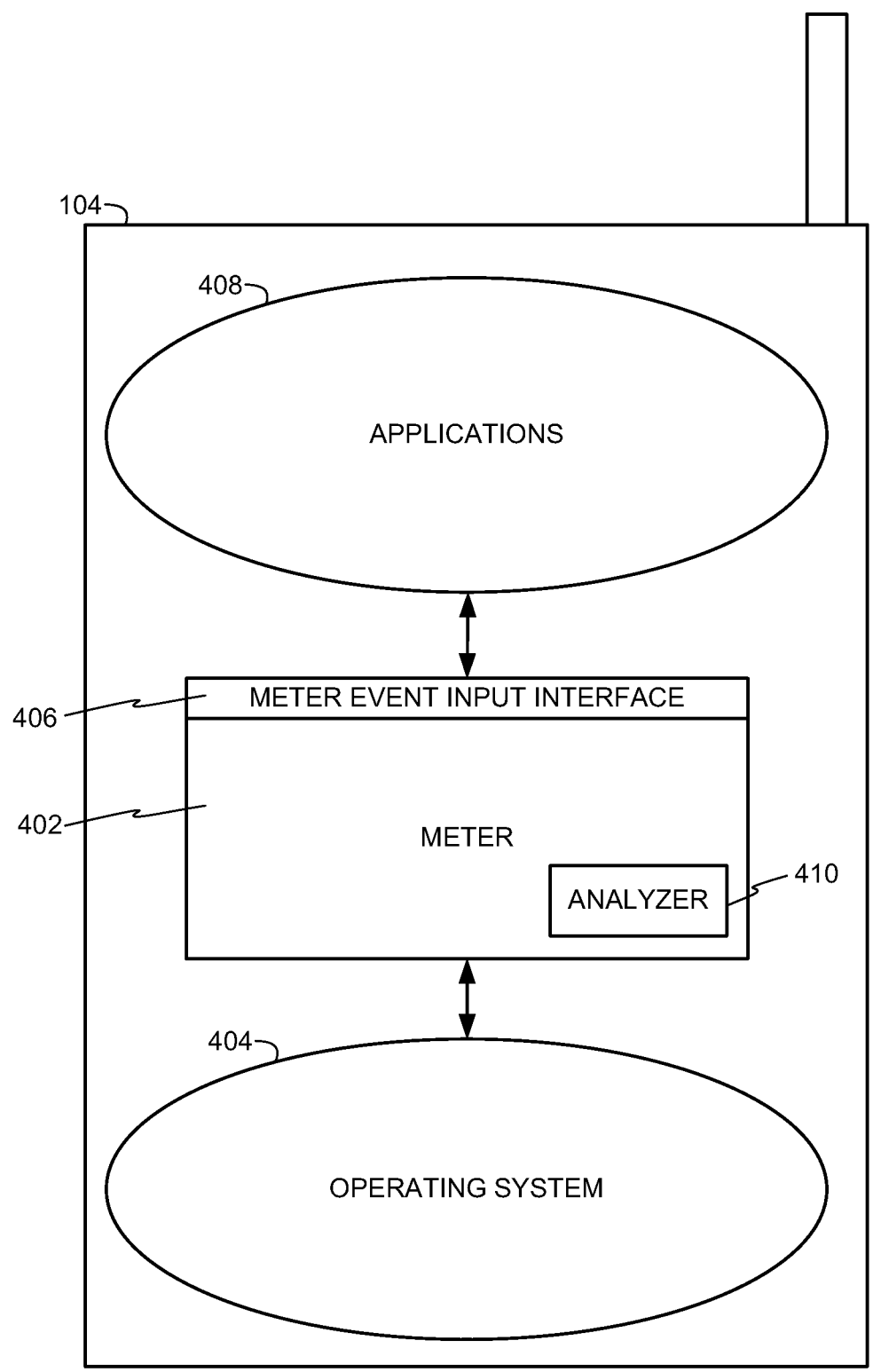
FIGS. 4 and 5 depict block diagrams of an example mobile communication device of FIG. 1.
Figure 5:
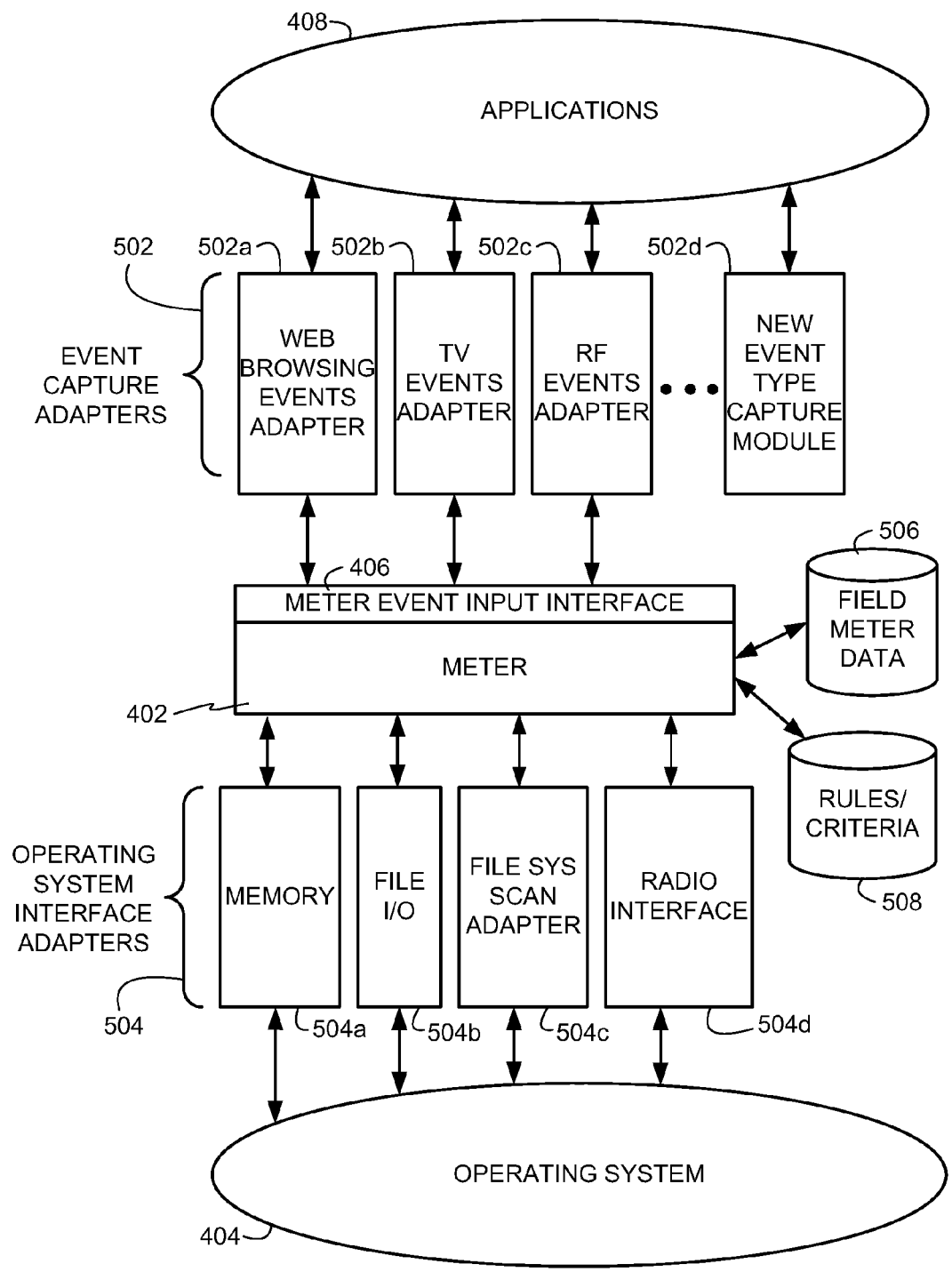

FIGS. 4 and 5 depict block diagrams of one of the example client devices of FIG. 1. As shown in FIG. 4, the example field mobile communication device 104 includes a meter 402 communicatively coupled to an operating system 404 of the device 104. The meter 402 includes a meter event input interface 406 through which the meter 402 can communicate to applications 408 installed in the field mobile communication device 104. In the illustrated example, the field mobile communication device 104 is configured to generate metering information as described herein. For example, the meter 402 can scan files or other data stored in a memory of the device 104 to generate metering information and/or can receive events from one or more of the applications 408 to generate metering information corresponding to media content (e.g., television video, audio, web page navigations, application usage, etc.) received by and/or presented by the field mobile communication device 104. In the illustrated example, the meter 402 is provided with an analyzer 410 configured to analyze field-generated metering information at the device 104. For example, while executing on the device 104, the analyzer 410 can compare field-generated hashes or signatures generated at the device 104 to reference hashes or signatures received from the server 114 at the media measurement entity 102. Additionally, the analyzer 410 can analyze field-generated metering information at the device 104 in connection with reference metadata (e.g., the metadata 302 of FIG. 3) received from the server 114.

In example implementations in which the meter 402 is not configured to perform extensive analyses, the analyzer 410 may instead be implemented in the server 114. For example, the analyzer 410 can alternatively be implemented using the analyzer 128 in the server 114 as shown in FIG. 6. Different factors can be used to determine whether to implement the analyzer 410 in the field mobile communication devices 104 and/or to implement the analyzer 128 in the server 114. For instance, the analyzer 128 can be implemented in the server 128 for use in connection with devices 104 that do not have sufficient memory or processing capability, while the analyzer 410 can be implemented in the devices 104 that have sufficient memory and processing capability. In addition, for networks that have limited or constrained bandwidth, thereby limiting the amount of or rate at which field-generated metering information can be transmitted by the devices 104 to the media measurement entity 102, the analyzer 410 can be implemented in the devices 104 so that the devices 104 can analyze the field-generated metering information and transmit analyses results to the media measurement entity 102 without needing to transmit all of the field-generated metering information.

As shown in FIG. 5, the meter event input interface 406 is communicatively coupled to the applications 408 via event capture adapters 502. In the illustrated example, the event capture adapters 502 are configured to gather information associated with media content presented via the applications 408 and/or usage of the applications 408. Some of the adapters 502 may retrieve information from the applications or memory areas in use by the applications while others of the adapters 502 may be configured to retrieve information from memory areas used to store files (e.g., media files) accessed by the applications 502. For instance, a web browsing events adapter 502a is configured to access cache files generated by a web browser including a history listing of the websites visited by a particular one of the panel members 108 (FIG. 1). The web browsing events adapter 502a can operate during a web browser session or when a web browser application is not in use. A television events adapter 502b may be used to gather information about media content presented via a television application. For instance, while a television application is active, the television events adapter 502b may capture screen images by accessing and copying a display frame buffer used by the television application to present the television media content. In the illustrated example, the television events adapter 502b is to be used when a television application is executing and rendering video display images in a display frame memory buffer. An RF events adapter 502c may be used to gather information related to RF activity controlled by one or more of the applications 408. For example, RF activity may indicate whether a telephone call is being made. In the illustrated example, new event type capture module(s) 502d may be added after the meter 402 has already been installed on a particular field device 104. That is, the meter 402 is configured to have pluggable event adapters coupled thereto so that metering other types of events or media can be enabled or disabled dynamically without having to re-install a different version of the meter 402.

Also shown in the illustrated example of FIG. 5 are operating system (OS) interface adapters 504. The OS interface adapters 504 may be used to access portions of the mobile device 104 that are protected by the operating system 404, mapped through the operating system 404, or require access via the operating system 404 to prevent the mobile device 104 from malfunctioning. In the illustrated example, the OS system interface adapters 504 include a memory adapter 504a, a file I/O adapter 504b, a file system scanner adapter 504c, and a radio interface adapter 504d.

In the illustrated example, the file system scanner adapter 504c is provided to scan files stored in the field device 104 based on particular criteria to generate metering information indicative of media contents stored in the field device 104. For example, file scanning criteria may include a file extension (e.g., .mp3), and the file system scanner adapter 504c may be configured to collect all the file names of all the .mp3 files on the field device 104. In some example implementations, the file system scanner adapter may be configured to retrieve metadata information from media files included in, for example, header information (e.g., ID3 tags) to obtain song titles, video titles, etc. In the illustrated example of FIG. 5, the file system scanner adapter 504c is implemented separately from the memory adapter 504a and the file I/O adapter 504b and may be configured to work with the memory adapter 504a and the file I/O adapter 504b to perform its operations. In other example implementations, the file system scanner adapter 504c may be implemented using the memory adapter 504a and/or the file I/O adapter 504b.

In the illustrated example of FIG. 5, the meter 402 is communicatively coupled to a field meter data structure 506 and a rules/criteria data structure 508. The field meter data structure 506 is used to store panel metering information generated by the meter 402 based on the information received from the event adapters 502. The rules/criteria data structure 508 is used to store rules and/or criteria that specify how the meter 402 or the adapters 502 should function with respect to different aspects of operation. For example, a file system scan criterion may indicate that a file system scanner adapter should find all files having a .mp3extension. An example rule stored in the data structure 508 may indicate when the mobile communication device 104 should communicate metering information from the field meter data structure 506 back to the server 114.

FIG. 6 depicts a block diagram of an example implementation of the server 114 of FIG. 1. The server 114 of the illustrated example receives media content streams (e.g., video content streams from a mobile services provider such as the MobiTV™ service) or other media content, determines identifying information for the content streams, and uses the identifying information to generate reference metering information for content also received at the field mobile communication devices 104 (FIG. 1). The example server 114 is capable of receiving content streams encoded in multiple formats and/or configured for multiple different media devices (e.g., different types of mobile devices, mobile devices from different manufacturers, etc.). For example, the server 114 may analyze a content stream formatted for a standard mobile phone, a smart mobile phone, and/or a personal digital assistant (PDA) mobile phone.

The server 114 of the illustrated example includes one or more emulated mobile devices 602 (e.g., emulated receiving device terminals), the analyzer 128 (illustrated as external to the server 114 in FIG. 1), and a database 606.

The one or more emulated receiving devices 602 may be implemented using any type of communication device that is capable of receiving and/or processing a content stream (i.e., content stream 1, content stream 2, content stream N) (e.g., a video content stream received from a mobile services provider). For example, any one or more of the emulated receiving devices 602 may be implemented using one or more mobile communication device handsets (not shown), one or more mobile communication device emulation software, laboratory wireless test equipment (e.g., radio frequency (RF) test and measurement analyzers/generators, wireless test manager equipment, CDMA test equipment, GSM test equipment, etc.) connected to call control software and media handlers/decoders. The handsets, emulation software, and/or wireless test equipment may be capable of emulating or configured to emulate different types of mobile communication devices (e.g., mobile communication devices from different manufacturers, having different media applications, having different hardware capabilities, etc.) so that the server 114 can analyze data configured (e.g., compressed, formatted, and/or encoded) for multiple different communication devices. In other words, a single mobile phone may be configured to appear as a first mobile phone to the communication network during a first time period and a second mobile phone during a second time period. By varying the appearance of a communication device (e.g., by communicating a particular type, style, format, identifier, etc. to the service provider, by requesting content of a particular type and/or in a particular format, by communicating in a particular manner, etc.), communication streams formatted or configured for each of a desired type of communication device can be received and analyzed. Alternatively, the one or more emulated receiving devices 602 may be implemented by multiple communication devices (e.g., one mobile device may be provided for each type of mobile device for which analysis of a corresponding content stream that is desired, required, and/or requested). Additionally or alternatively, the one or more emulated receiving devices 602 may each be implemented using multiple components. For example, the one or more emulated receiving devices 602 may be implemented using a mobile device attached to a media decoder and/or analysis device (e.g., a mobile device attached to a content decoding card installed in the server 114).

The one or more emulated receiving devices 602 perform any operation necessary to access the content (e.g., audio, video, text, etc.) of the received content streams. For example, the one or more emulated receiving devices 602 may be provided with media decoders to decrypt, decompress, decode, demodulate, reformat, resize, and/or perform any other operation on the content stream. For example, as described above, the one or more emulated receiving devices 602 may include one or more modules, components, and/or devices to access the content.

The one or more emulated receiving devices 602 of the illustrated example are further capable of extracting, computing, and/or generating identifying information (e.g., field metering information) from the content of the content stream to determine reference metering information. The one or more emulated receiving devices 602 of the illustrated example compute a reference hash value or reference signature for the content of the received content stream. Alternatively, the example one or more emulated receiving devices 602 may compute any other type of unique or substantially unique identifier, may extract an identification code, may identify a watermark, etc. In addition, the one or more emulated receiving devices 602 of the illustrated example extract additional identifying information associated with the content when the content stream includes such identifying information. For example, the one or more emulated receiving devices 602 may extract metadata identifying a channel name and/or number of the media content, a date and/or time associated with the media content, a program name/title associated with the media content, a broadcaster of the media content, etc.

The one or more emulated receiving devices 602 transmit any extracted, computed, and/or generated identifying reference metering information to the analyzer 128 and/or store the reference metering information in the database 118 of FIG. 1.

The analyzer 128 (e.g., also referred to as a media correlator) of the illustrated example receives identifying information from the one or more emulated receiving devices 602 and transmits the identifying information to field mobile communication devices 104 and/or compares the identifying information to information received from the field mobile communication devices 104 (e.g., information received from the field mobile communication devices associated with content presented and/or stored at the field mobile communication devices). Based on the comparison, the analyzer 128 determines information or content that was presented at the field mobile communication devices 104. For example, the analyzer 128 compares a hash (e.g., an exact hash and/or a similarity hash) computed at the field mobile communication device 104 for video content that was presented at the field mobile communication device 104 to a reference hash received from the one or more emulated receiving devices 602 to determine the identity of the video content that was, is, and/or will be presented at the field mobile communication device 104. (Content that will be presented is content that has been received and/or stored in the field mobile communication device 104 but not yet presented via the field mobile communication device 104.) Alternatively, such a comparison may be performed at the field mobile communication device 104. According to the illustrated example, the analyzer 128 compares exact hashes received from the field mobile communication devices 104 to reference hashes received from the one or more emulated receiving devices 602 and/or compares similarity hashes received from the field mobile communication devices 104 to reference hashes received from the one or more emulated receiving devices 602. The analyzer 128 may determine any other information about the content and/or the presentation of the content such as, for example, the time of presentation, the duration of presentation, the date of presentation, etc. In addition, the analyzer 128 may aggregate media presentation or media access statistics for multiple field mobile communication devices 104. The results of the analysis of the analyzer 128 are stored in the database 606 and/or presented in a report generated by the analyzer 128. In addition, the analyzer 128 may include a database (not shown) or other type of data storage for storing intermediate analysis results and/or identifying information received from the one or more emulated receiving devices 602.

The database 606 may be any type of data storage device such as, for example, a database, a hard drive, a flash memory, a removable storage, a file, a file system (e.g., multiple files), etc. The database 606 may be made available to any desired party. For example, the contents of the database 606 may be made available on the Internet.

In the illustrated examples described above in connection with FIGS. 5 and 6, the example meter 402, the meter event capture input interface 406, the event capture cards 502, the operating system interface adapters 504, the field meter data structure 506, the rules/criteria data structure 508, the emulators 602, the analyzer 128, and/or the database 606 may be implemented using any desired combination of hardware, firmware, and/or software. For example, one or more integrated circuits, discrete semiconductor components, and/or passive electronic components may be used. Thus, for example, any of the elements shown in FIGS. 5 and 6, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 22:
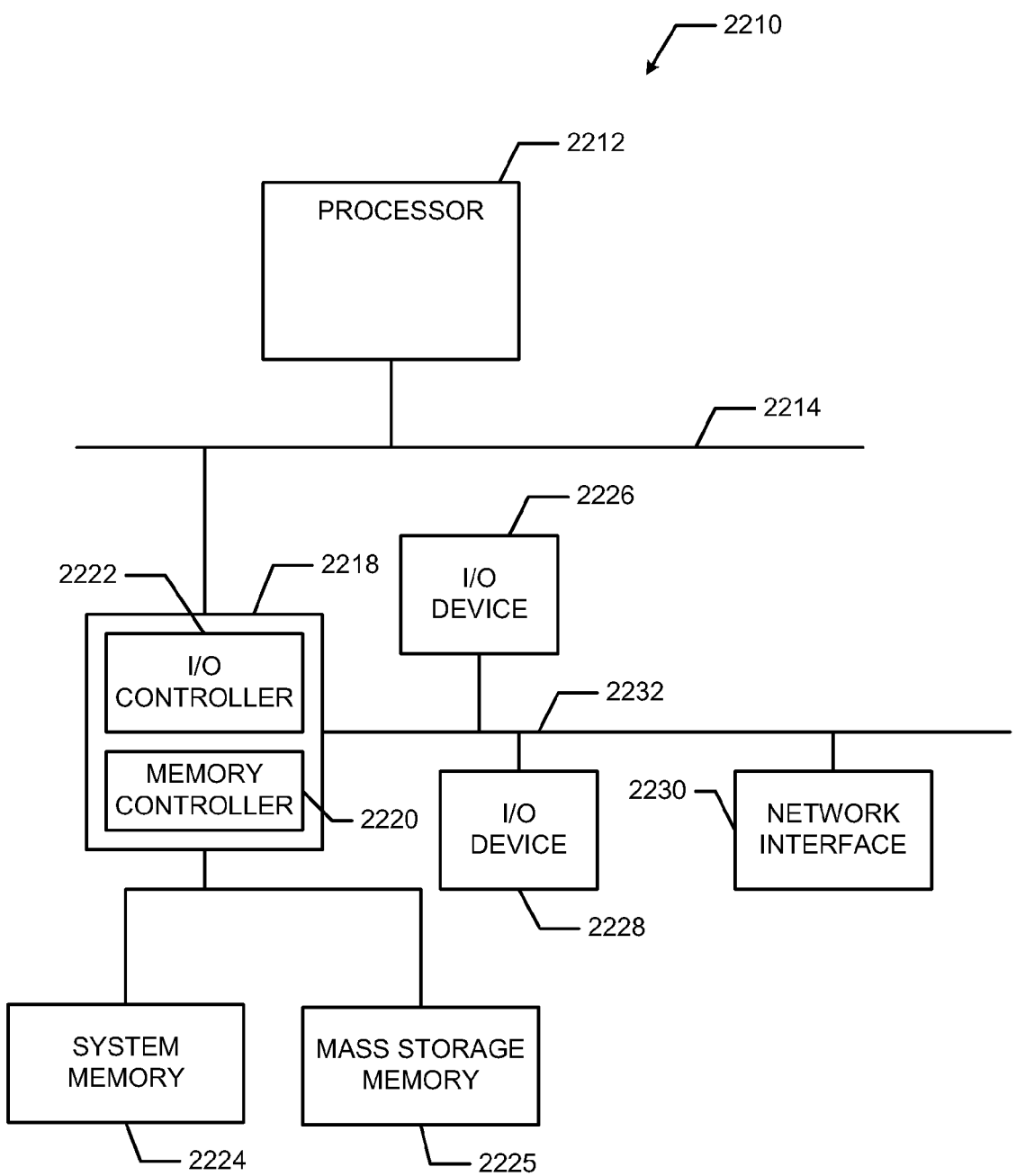
FIG. 22 is a block diagram of an example processor system that may be used to perform the example processes of FIGS. 7-16, 17A, 17B, and 18-21 to implement the example systems, apparatus, and/or methods described herein.

Some or all of the elements shown in FIGS. 5 and 6, or parts thereof, may be implemented using instructions, code, and/or other software and/or firmware, etc. stored on a computer-readable medium and executable by, for example, a processor system (e.g., the example processor system 2210 of FIG. 22). When any of the appended claims are read to cover a purely software implementation, at least one of the elements shown in FIGS. 5 and 6 is hereby expressly defined to include a tangible medium such as a memory, DVD, CD, etc.

Flow diagrams depicted in FIGS. 7-16, 17A, 17B, and 18-21 are representative of machine or computer-readable instructions that can be executed to implement the example methods, systems, and apparatus described herein. The example processes of FIGS. 7-16, 17A, 17B, and 18-21 may be performed using a processor, a controller and/or any other suitable processing device. For example, the example processes of FIGS. 7-16, 17A, 17B, and 18-21 may be implemented in coded instructions stored on a tangible medium such as a flash memory, a read-only memory (ROM) and/or a random-access memory (RAM) associated with a processor (e.g., the example processor 2212 discussed below in connection with FIG. 22). Alternatively, some or all of the example processes of FIGS. 7-16, 17A, 17B, and 18-21 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations of the example processes of FIGS. 7-16, 17A, 17B, and 18-21 may be implemented manually or as any combination(s) of any of the foregoing techniques, for example, any combination of firmware, software, discrete logic and/or hardware. Further, although the example processes of FIGS. 7-16, 17A, 17B, and 18-21 are described with reference to the flow diagrams of FIGS. 7-16, 17A, 17B, and 18-21, other methods of implementing the processes of FIGS. 7-16, 17A, 17B, and 18-21 may be employed. For example, the order of execution of the blocks may be changed, and/or some of the blocks described may be changed, eliminated, sub-divided, or combined. Additionally, any or all of the example processes of FIGS. 7-16, 17A, 17B, and 18-21 may be performed sequentially and/or in parallel by, for example, separate processing threads, processors, devices, discrete logic, circuits, etc.

Figure 7:
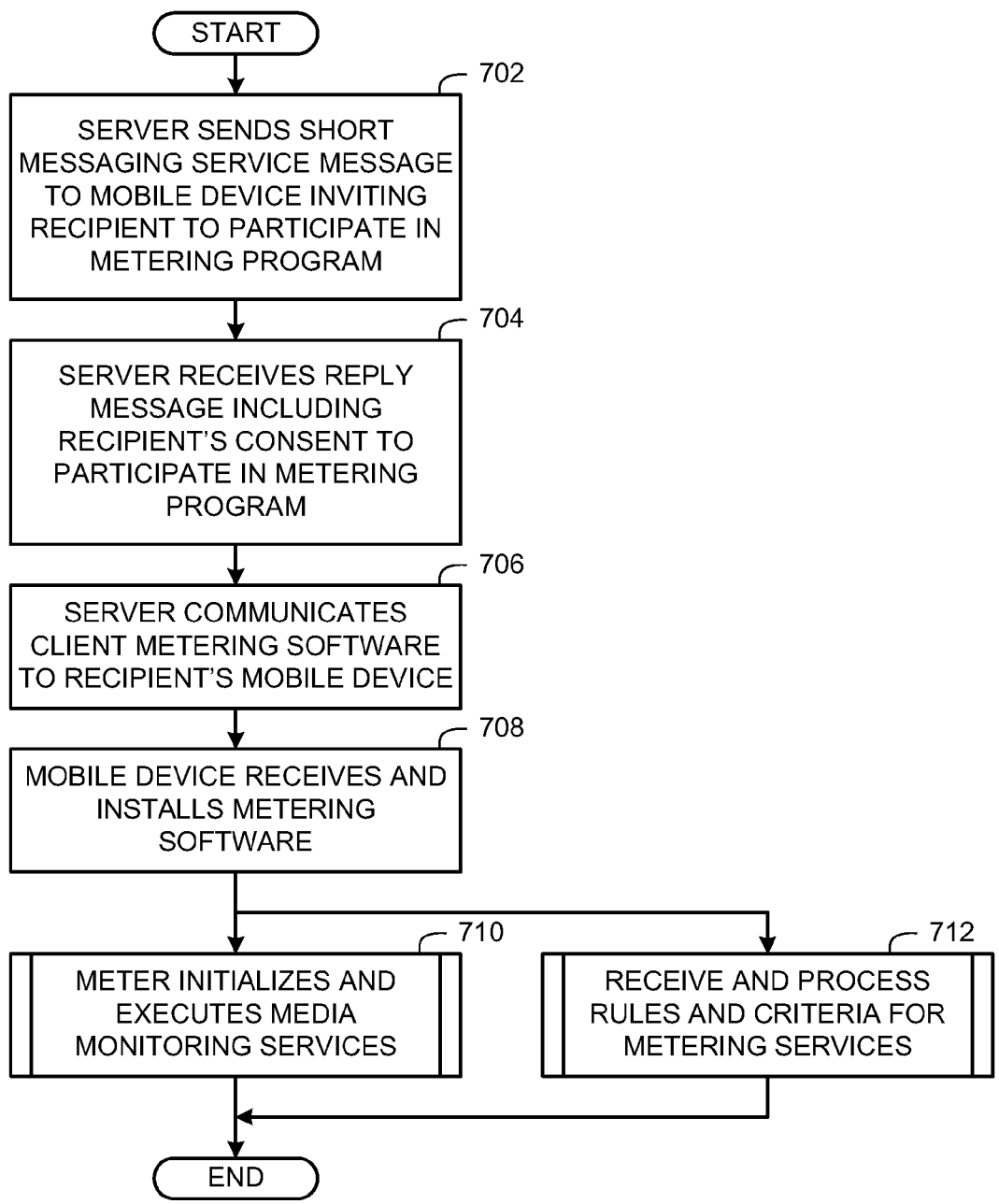
FIG. 7 depicts example computer-readable instructions that may be executed to monitor media presented via the mobile communication devices of FIG. 1.

FIG. 7 depicts example machine or computer-readable instructions that may be executed to monitor media presented via the mobile communication devices 104 of FIG. 1. The example process of FIG. 7 may be used to load a meter (e.g., the meter 402 of FIG. 4) onto the field mobile communication devices 104 of FIG. 1 and operate the meter to generate field metering information. Initially, the server 114 sends a short messaging service (SMS) message to one of the field mobile communication devices 104 (FIG. 1) inviting the recipient (e.g., one of the panel members 108) to participate in a metering program (block 702). The server 114 then receives a reply message including the recipient's consent to participate in the metering program (block 704). The server 114 then communicates client metering software to the recipient's mobile device 104 (block 706). The mobile device 104 receives and installs the metering software (block 708). In the illustrated example, the metering software is used to implement the meter 402, the meter event input interface 406, and one or more of the event capture adapters 502. The metering software is also used to allocate memory space to implement the data structures 506 and 508. In some example implementations, the metering software is also configured to implement adapters (e.g., file system scanner adapters) to work in cooperation with the OS interface adapters 504 to generate metering information using OS function calls to access portions of the mobile device 104 via the operating system 404.

The meter 402 is then executed to initialize and execute media monitoring services (block 710). Example processes that may be used to implement the media monitoring services are described below in connection with FIGS. 9-16. In parallel, the meter 402 also executes a process to receive and process rules and/or criteria for metering services (block 712) and store the rules and/or criteria in the rules/criteria data structure 508 (FIG. 5). The example operation of block 712 can be implemented using the example process described below in connection with FIG. 8. The example process of FIG. 7 is then ended.

Figure 8:
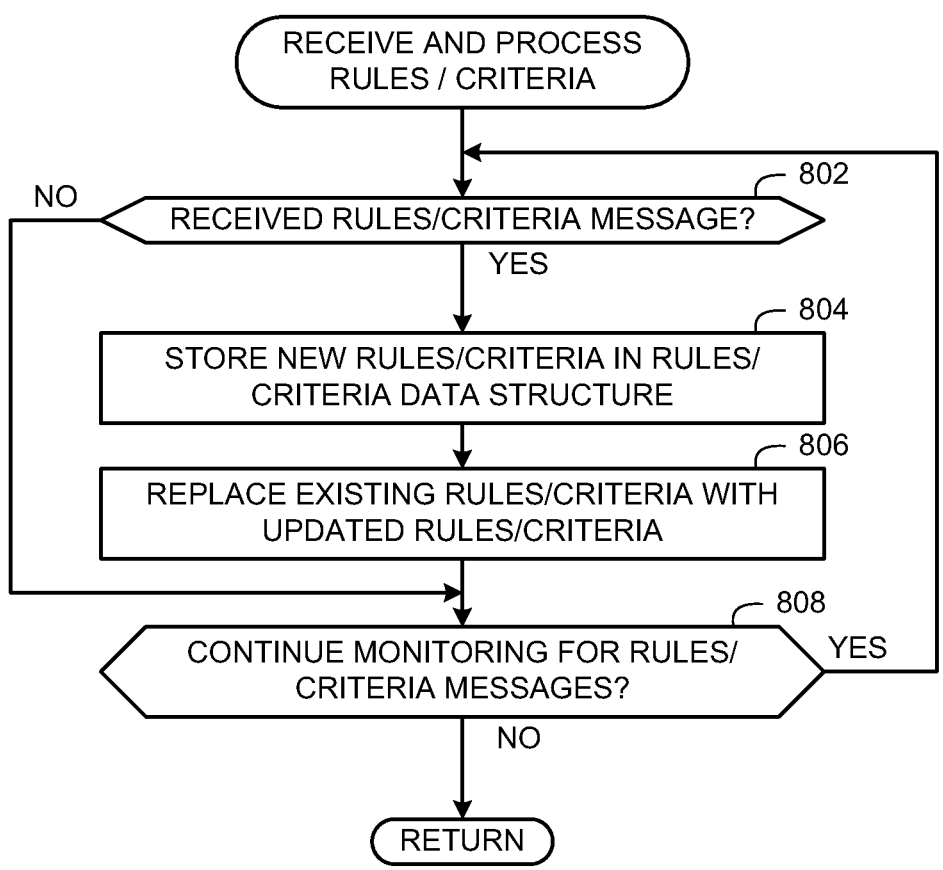
FIG. 8 depicts example computer-readable instructions that may be executed to receive and process rules and/or criteria to be used in connection with monitoring media presented via the mobile communication devices of FIG. 1.

FIG. 8 depicts example machine or computer-readable instructions that may be executed to receive and process rules and/or criteria to be used in connection with monitoring media presented via the mobile communication devices 104 of FIG. 1. The example process of FIG. 8 may be used to implement the operations of block 712 of FIG. 7. Initially, the meter 402 determines whether it has received a rules/criteria message (block 802). If the meter 402 has received a rules/criteria message (block 802), the meter 402 stores new rules/criteria (block 804) and replaces any existing rules/criteria with updated rules/criteria (block 806) in the rules/criteria data structure 508. After processing the received message or if the meter 402 has not received a rules/criteria message, the meter 402 determines whether to continue monitoring for rules/criteria messages (block 808). If the meter 402 is to continue monitoring, control returns to block 802. Otherwise, the example process of FIG. 8 returns to a calling function or process such as the example process of FIG. 7.

Figure 9:
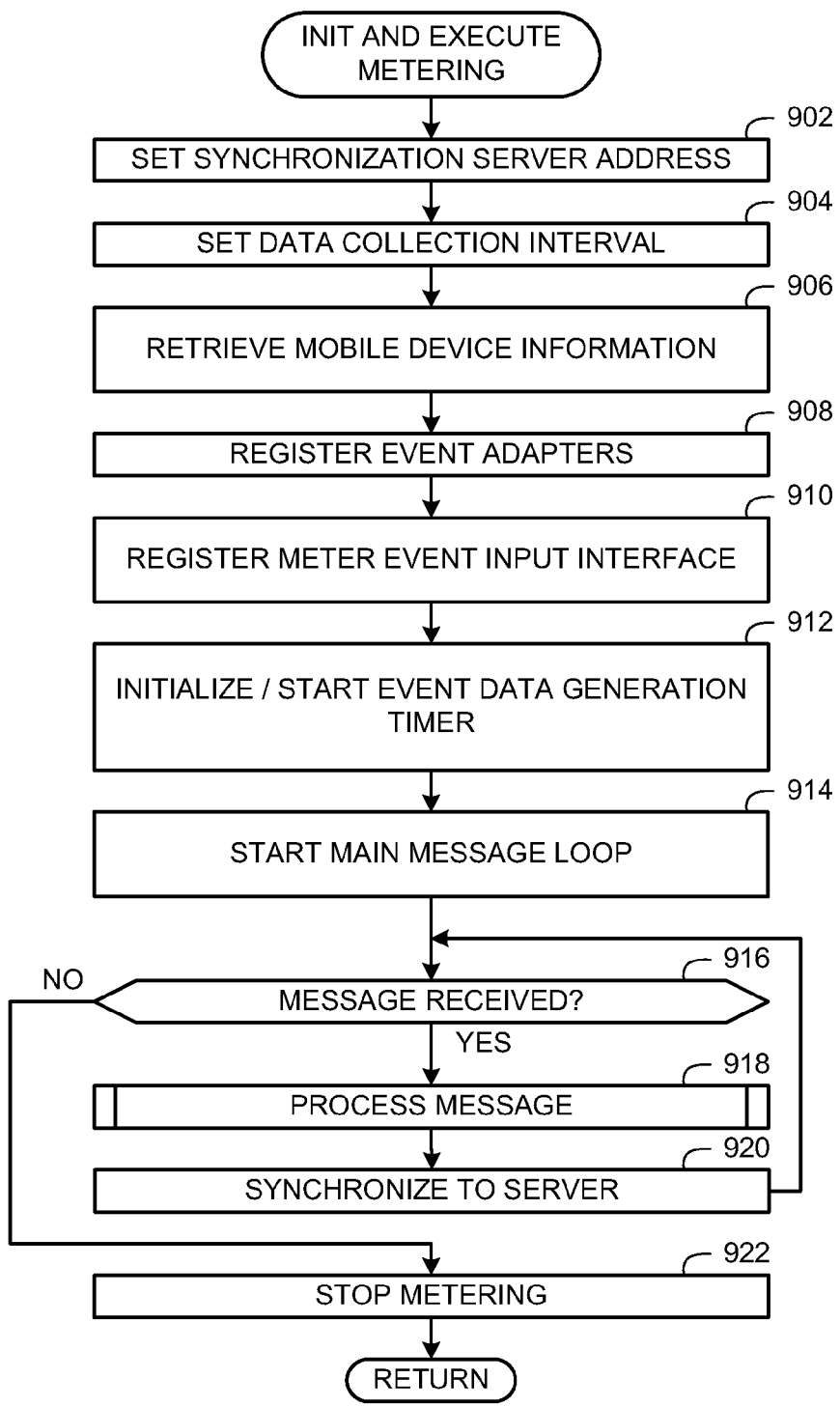
FIG. 9 depicts example computer-readable instructions that may be executed to initialize and execute a metering process on the mobile communication devices of FIG. 1.

FIG. 9 depicts example machine or computer-readable instructions that may be executed to initialize and execute a metering process on the mobile communication devices 104 of FIG. 1. Initially, the meter 402 sets a synchronization server address (block 902) specifying the address of the server 114 to which the meter 402 is to communicate metering information. The meter 402 then sets a data collection interval (block 904) indicative of when the meter 402 is to communicate metering information to the server 114. The data collection interval may be set based on one or more rules in the rules/criteria data structure 508, and the meter 402 may set different collection intervals for different types of media and/or different types of metering information.

The meter 402 then retrieves mobile device parameter information (block 906) which is indicative of the type of mobile device on which the meter 402 is operating. In the illustrated example, mobile device parameter information includes a mobile device identifier, an international mobile equipment identity (IMEI), a manufacturer parameter of a mobile device, a model of a mobile device, an operating system of a mobile device, a subscriber identification or communication number (e.g., a telephone number), a current date and/or time, etc.). The parameter information may be received from an operator and/or may be extracted from a data source (e.g., a list of parameter information and/or an actual mobile device). The device parameter information can be used to obtain reference metering information (e.g., reference hashes) generated for the same type of device having the same type of media decoder or media decoding capabilities so that exact, near-exact, or similarity matches can be found between field-generated hashes of the mobile communication device 104 and reference hashes stored in the reference metering information data structure 118. In some example implementations, the device parameters may be associated with a device type ID at the meter 402 or at the server 114, and reference hashes may be stored in association with respective device type ID's so that the correct reference hashes can be retrieved for analyzing field-generated hashes having associated device type ID's.

The meter 402 then registers event adapters 502 (block 908) and the meter event input interface 406 (block 910) with the operating system 404 (FIGS. 4 and 5). The meter 402 then initializes and starts an event data generation timer (block 912) that specifies when to collect event data from the event adapters 502. The meter 402 then starts a main message loop (block 914) to process messages to service the event adapters 502.

The main message loop is a process as shown at blocks 916, 918, and 920. When a message is received (block 916), the meter processes the message (block 918) and the meter synchronizes the information to the server 114 (block 920). The message processing operation of block 918 can be implemented using the example process of FIG. 10. An example process to implement the synchronization process of block 920 may be implemented to synchronize data conditionally based on the interval(s) and/or conditions set at block 904. When no more messages are received (block 916), the meter 402 stops metering (block 922) and control returns to a calling function or process such as the example process of FIG. 7.

Figure 10:
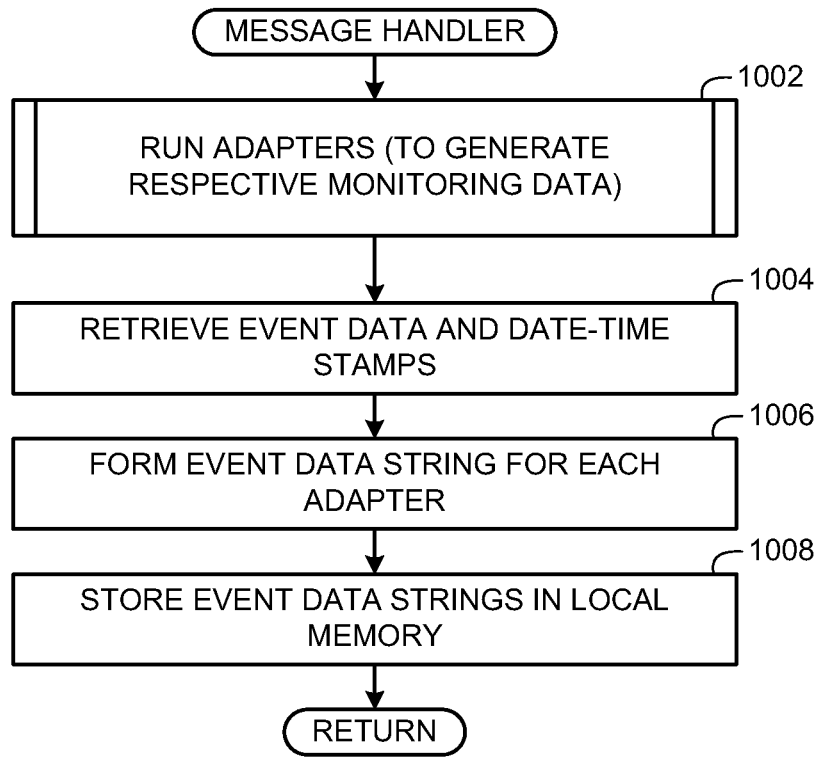
FIG. 10 depicts example computer-readable instructions that may be executed to handle messages to generate media metering information via the mobile communication devices of FIG. 1.

FIG. 10 depicts example machine or computer-readable instructions that may be executed to handle messages to generate media metering information via the mobile communication devices 104 of FIG. 1. The example process of FIG. 10 may be used to implement the example operation of block 918 of FIG. 9. Initially, the meter 402 runs or executes at least some of the adapters 502 (FIG. 5) (block 1002). For example, some of the adapters such as the television events adapter 502b may be configured to run asynchronously based on events generated by their corresponding applications. Other adapters 502 may be configured to run synchronously and are triggered by the message handler process of FIG. 10.

The meter 402 then retrieves the event data and respective date-time stamps for all of the event adapters (block 1004) and forms an event data string for the event data from each adapter (block 1006). In the illustrated example, the meter 402 forms each data string using the extensible markup language (XML) format. Other formats may alternatively be used. The meter 402 then stores the event data string in a local memory (e.g., the field meter data structure 506 of FIG. 5) (block 1008). Control then returns to a calling function or process such as the example process of FIG. 9.

Figure 11:
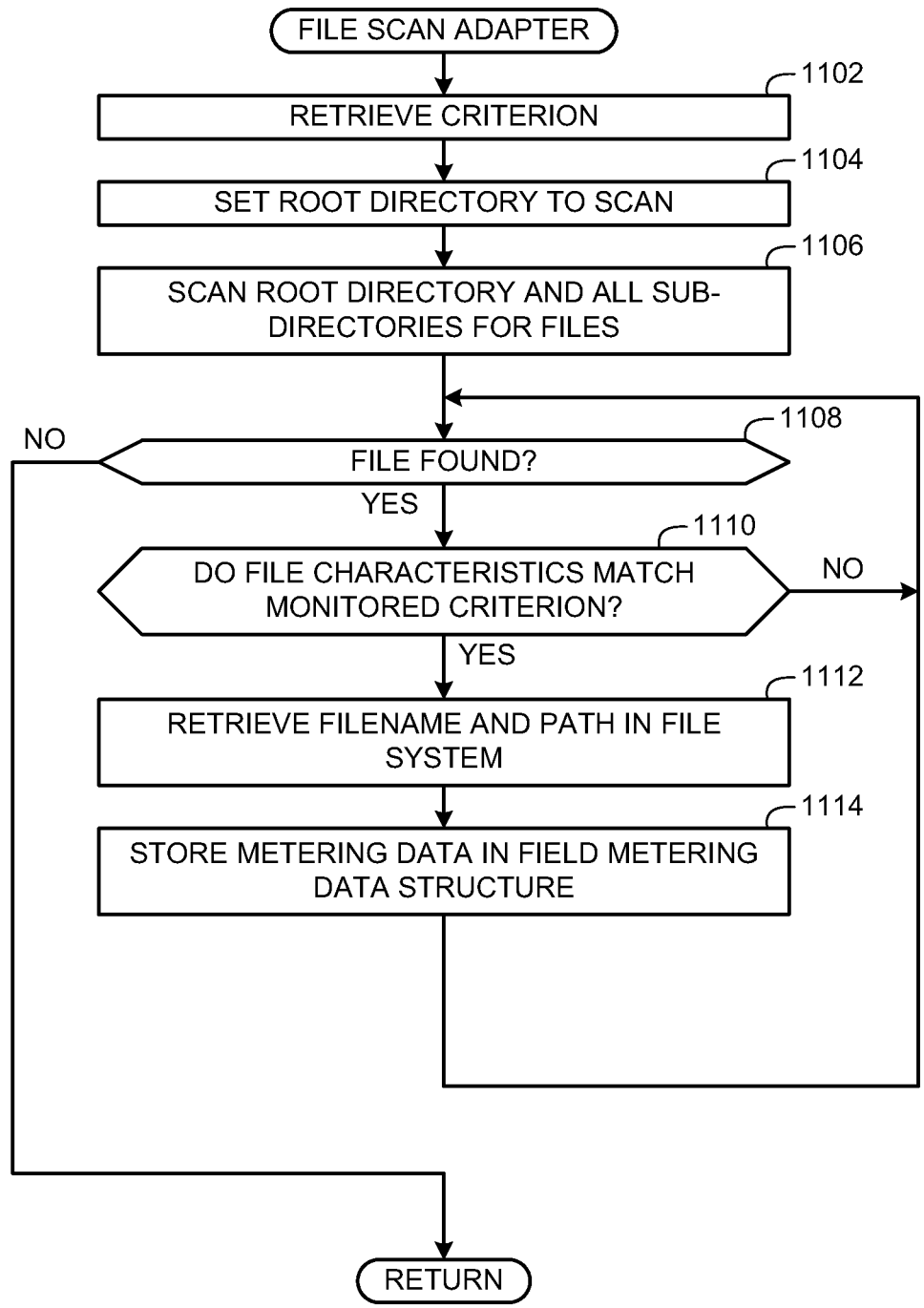
FIG. 11 depicts example computer-readable instructions that may be executed to implement a file system events adapter on the mobile communication devices of FIG. 1.

FIG. 11 depicts example machine or computer-readable instructions that may be executed to implement the file system scan adapter 504c (FIG. 5) on the mobile communication devices 104 of FIG. 1. The example process of FIG. 11 may be executed in connection with block 1002 of FIG. 10. Initially, the file system scan adapter 504c retrieves a criterion on which to base file scanning (block 1102). For example, the criterion may be retrieved from the rules/criteria data structure 508 of FIG. 5 and may specify that only files with a particular file extension (e.g., .mp3, .mov, etc.) should be scanned.

The file system scan adapter 504c then sets a root directory in which to scan files (block 1104). The name of the root directory may also be retrieved from the rules/criteria data structure 508 and may be set based on the model of the mobile device 104 or the media applications. For example, different mobile device models or different media applications may store media in different directories. The file system scan adapter 504c then scans the root directory and all of the sub-directories for files (block 1106) that meet the criterion retrieved at block 1102.

When a file is found (block 1108) and the characteristics of the file match the criterion (block 1110), the file system scan adapter 504c retrieves the filename and the path in the file system (block 1112). The file system scan adapter 504c then stores the metering information in the field meter data structure 506 (block 1114). When no more files are found (block 1108), control returns to a calling function or process such as the example process of FIG. 10.

Figure 12:
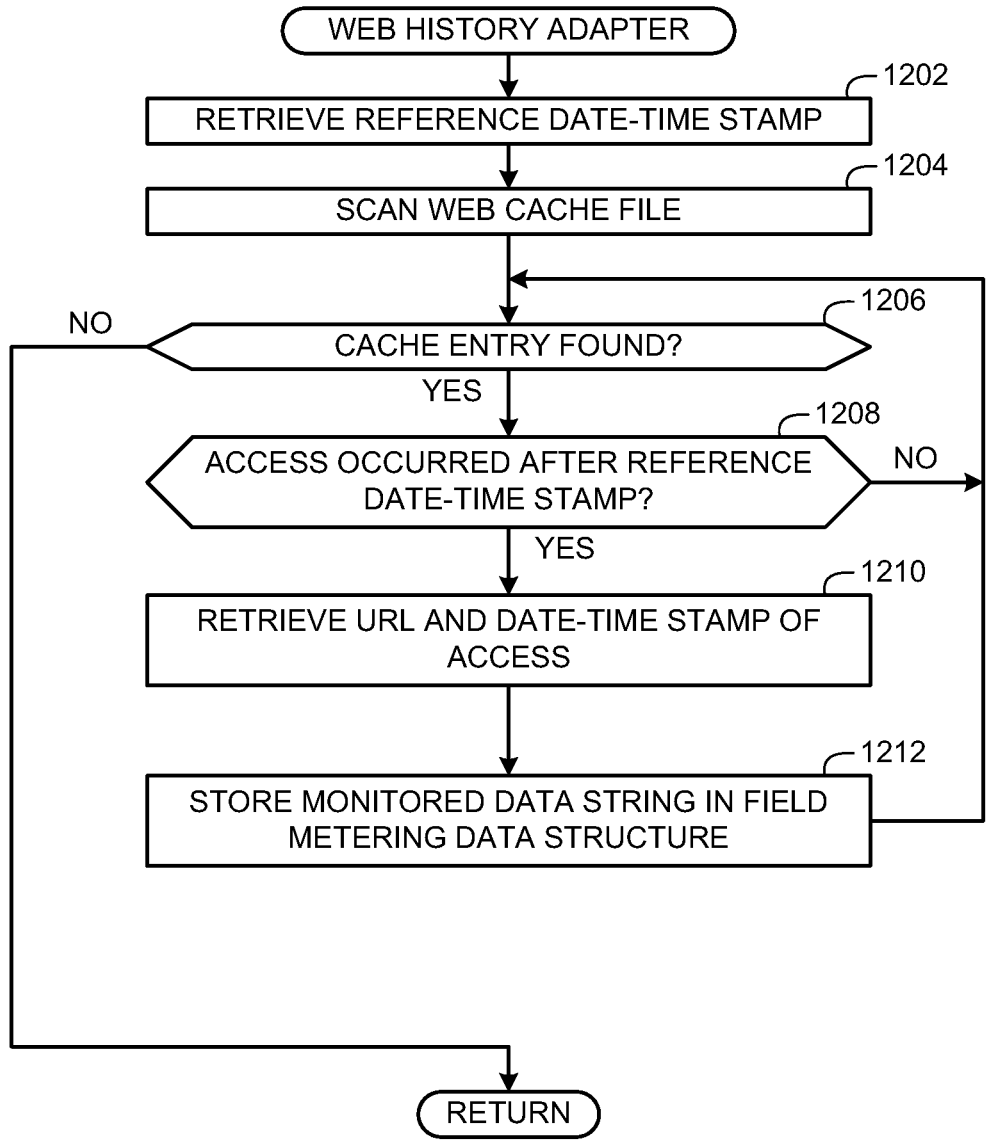
FIG. 12 depicts example computer-readable instructions that may be executed to implement a web browsing events adapter on the mobile communication devices of FIG. 1.

FIG. 12 depicts example machine or computer-readable instructions that may be executed to implement the web browsing events adapter 502a (FIG. 5) on the mobile communication devices 104 of FIG. 1. The example process of FIG. 12 may be executed in connection with block 1002 of FIG. 10. As shown in the illustrated example, the web browsing events adapter 502a is configured to retrieve a reference date-time stamp (block 1202) specifying the earliest date-time stamp that should be used for retrieving web browsing data. Any browsing data having an earlier date-time stamp is ignored. The web browsing events adapter 502a then scans a web cache file (block 1204) for relevant entries based on the date-time stamp. If an entry is found (block 1206) and it occurred after the date-time stamp criterion (block 1208), the web browsing events adapter 502a retrieves the URL and the date-time stamp of access corresponding to that entry (block 1210). The web browsing events adapter 502a then stores the metering data in the field meter data structure 506 (block 1212). When no more entries are found (block 1206) control returns to a calling function or process such as the example process of FIG. 10.

Figure 13:
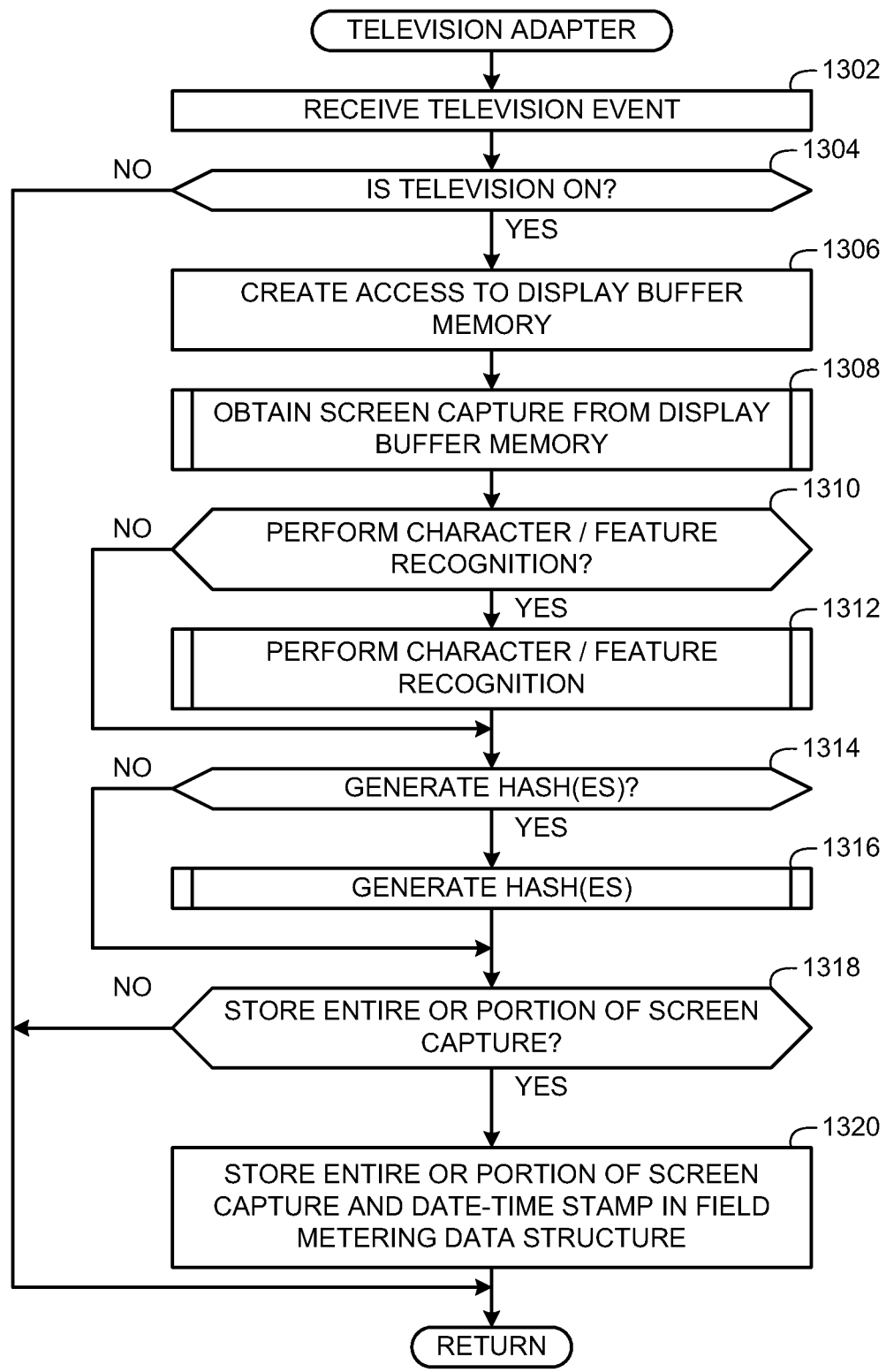
FIG. 13 depicts example computer-readable instructions that may be executed to generate metering information for television media presented via the mobile communication devices of FIG. 1.
Figure 14:
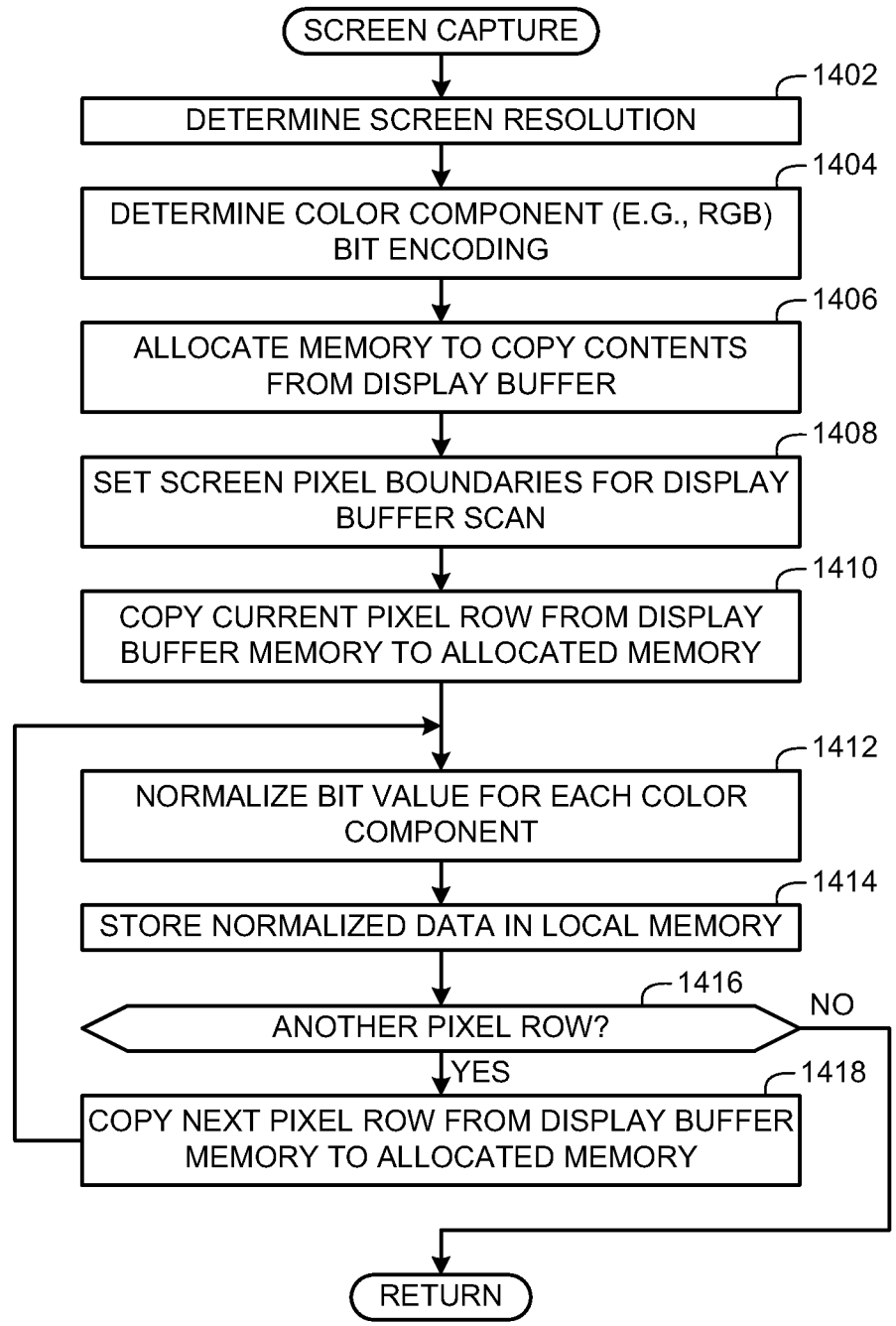
FIG. 14 depicts example computer-readable instructions that may be executed to capture screen information displayed via the screens of the mobile communication devices of FIG. 1.

FIG. 13 depicts example machine or computer-readable instructions that may be executed to generate metering information for television media presented via the mobile communication devices 104 of FIG. 1. The example process of FIG. 13 may be used to implement the television events adapter 502b of FIG. 5 and may be executed in an asynchronous fashion when television events (e.g., channel change events, on events, off events, etc.) are detected. When a television event is received (block 1302) and the television application is on (block 1304), the television events adapter 502b creates access to a display buffer memory used for the television application (block 1306). For example, the television events adapter 502b may use a DirectDraw function or an operating system call to access the memory buffer. The television events adapter 502b then obtains a screen capture from the display memory buffer (block 1308). An example process that may be used to obtain a screen capture at block 1308 is shown in FIG. 14.

Figure 15:
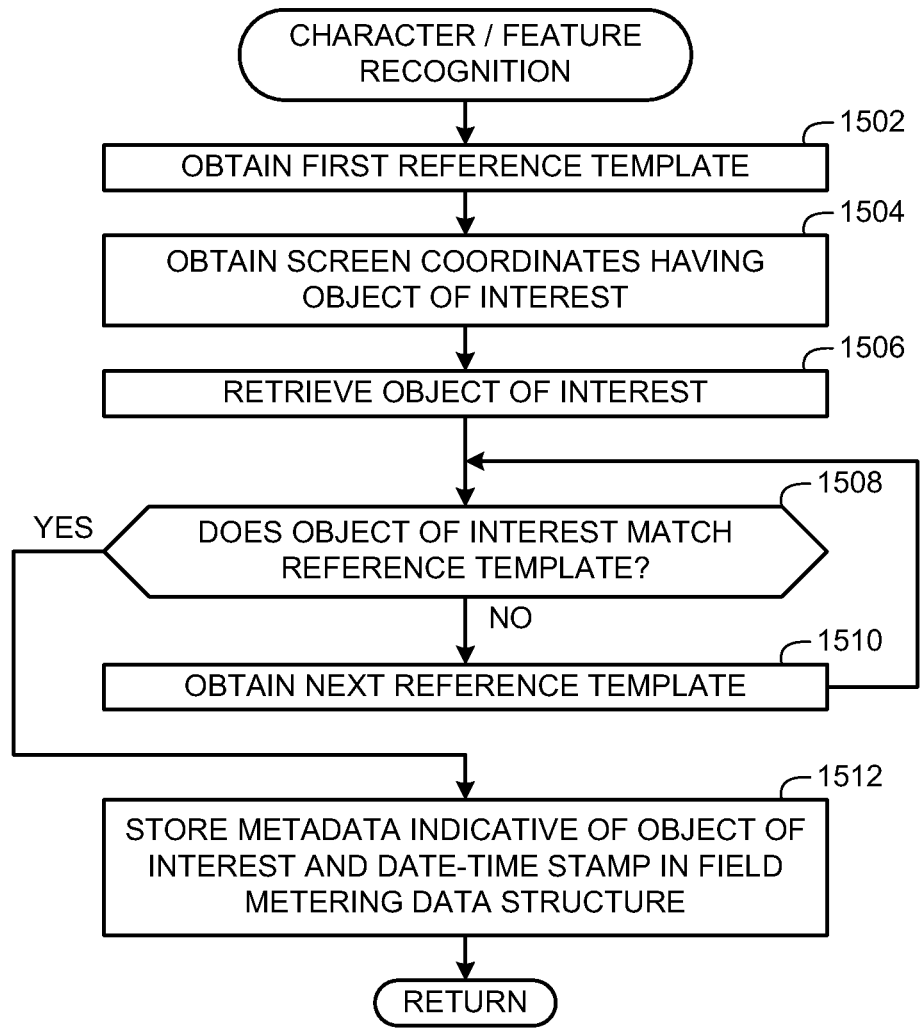
FIG. 15 depicts example computer-readable instructions that may be executed to implement a character/feature recognition process on the mobile communication devices of FIG. 1.

If the television events adapter 502b is configured to perform a character/feature recognition process (block 1310) (based on for example rules stored in the rules/criteria data structure 508), the television events adapter 502b performs the character/feature recognition process (block 1312). An example process that may be used to implement the character/feature recognition process of block 1312 is shown in FIG. 15.

Figure 16:
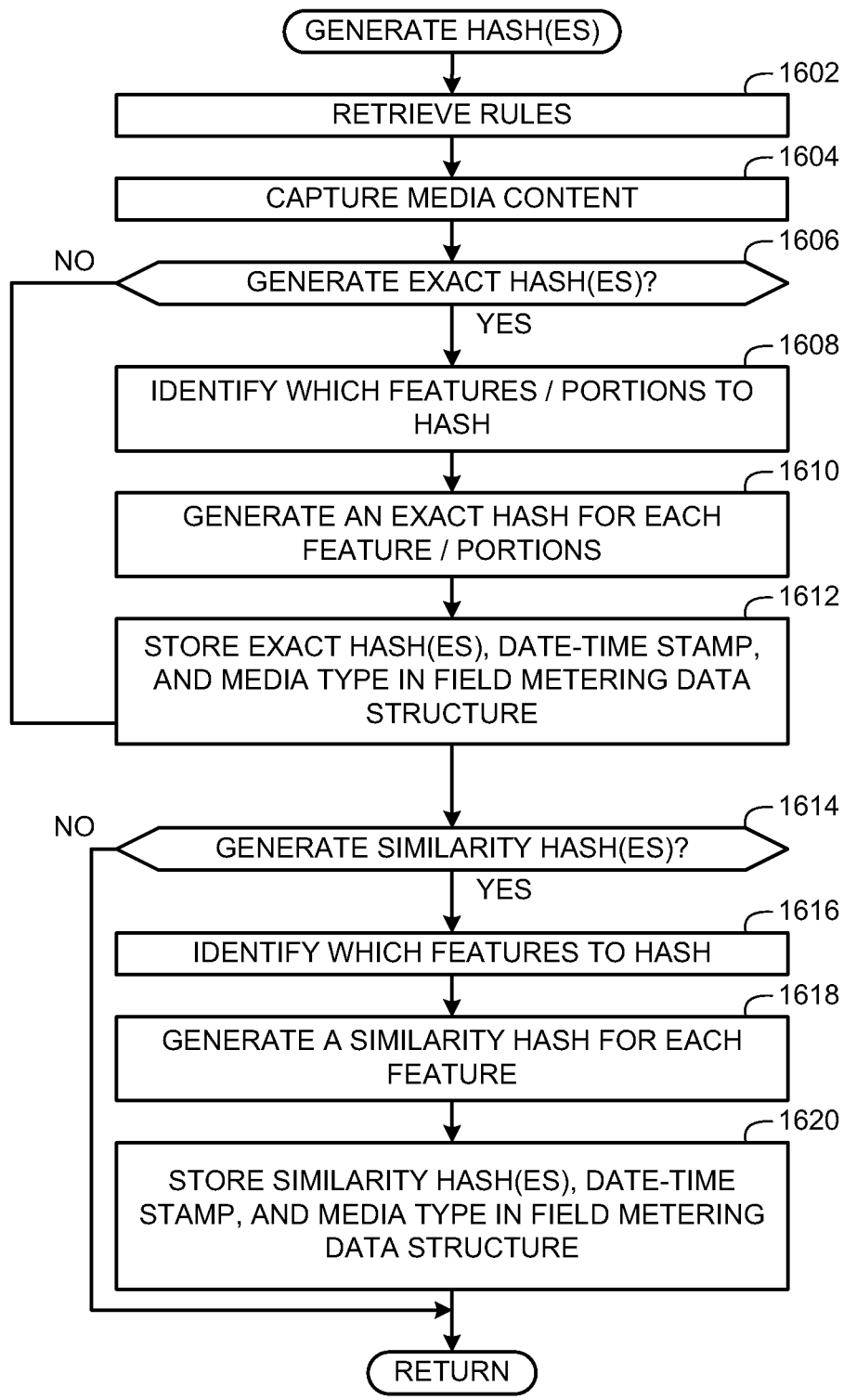
FIG. 16 depicts example computer-readable instructions that may be executed to generate hashes of media presented via the mobile communication devices of FIG. 1.

If the television events adapter 502b is configured to generate one or more hash(es) (block 1314) (based on for example rules stored in the rules/criteria data structure 508), the television events adapter 502b generates the hash(es) (block 1316). An example process that may be used to generate hashes at block 1316 is shown in FIG. 16.

If the television events adapter 502b is to store the entire or a portion of the screen capture (block 1318), the television events adapter 502b stores the entire or the portion of the screen capture and a corresponding date-time stamp in the field meter data structure 506 (block 1320). Control then returns to a calling function or process such as the example process of FIG. 9 or FIG. 10.

FIG. 14 depicts example machine or computer-readable instructions that may be executed to capture screen information displayed via the screens of the mobile communication devices 104 of FIG. 1. The example process of FIG. 14 can be used to implement the operation of block 1308 of FIG. 13. The example process is described as being implemented using the television events adapter 502b but could be implemented using any other adapter configured to work with display or image contents. In the illustrated example of FIG. 14, the television events adapter 502b determines the screen resolution (block 1402) and the color component (e.g., R:G:B) bit encoding (block 1404) of its mobile communication device 104. With this information, the television events adapter 502b can generate a screen capture based on the resolution of the screen, the number of bits and bit packing used to encode each color pixel (e.g., 16-bit R:G:B, 24-bit R:G:B, etc.).

The television events adapter 502b allocates memory space in which to copy contents from the display frame buffer of the mobile communication device 104 (block 1406). The television events adapter 502b sets the screen pixel boundaries to perform a display buffer scan (block 1408) on the display frame buffer and copies the contents of a current pixel row from the display frame buffer to the allocated memory space (block 1410). The television events adapter 502b normalizes the bit value for each color component of each pixel data (block 1412). In this manner, the pixel data and/or any hashes generated based on the pixel data can be compared across any type of pixel encoding. For example, if a specific encoding of a device is R:G:B=>5:6:5, the television events adapter 502b can normalize each color component of each pixel from 5:6:5 to 8:8:8 so that comparisons can be made against other image data having pixel data normalized to 8:8:8. In other example implementations, other techniques may be used to obtain a screen capture. In addition, the normalization may be omitted in some example implementations.

The television events adapter 502b stores the normalized data in local memory (block 1414). In this manner a subsequent process or operation (e.g., the operation of block 1316 of FIG. 13) can generate hashes or signatures based on the normalized data. The television events adapter 502b determines whether another pixel row in the display frame buffer remains to be processed (block 1416). If another pixel row remains to be processed (block 1416), the television events adapter 502b copies the contents of the next pixel row from the display frame buffer to the allocated memory space (block 1418) and control returns to block 1412. Otherwise, if no other pixel row remains to be processed (block 1416), the example process of FIG. 14 is ended and control returns to a calling function or process such as the example process of FIG. 13.

FIG. 15 depicts example machine or computer-readable instructions that may be executed to implement a character/feature recognition process on the mobile communication devices 104 of FIG. 1. The example process of FIG. 15 can be used to implement the operation of block 1312 of FIG. 13. The example process is described as being implemented using the television events adapter 502b but could be implemented using any other adapter configured to work with display or image contents. In the illustrated example of FIG. 15, the character/feature recognition process can be used to compare reference templates to portions of a screen shot to identify different metadata (e.g., channel number) or other media identification data. In other example implementations, other types of character/feature recognition techniques may be used (e.g., line detection techniques, edge detection techniques, etc.). The meter 402 can store comparison results (e.g., identified text or features) and/or any identified metadata and corresponding date-time stamps in the field meter data structure 506.

Initially, the television events adapter 502b obtains a first reference template (block 1502). A reference template provides a representation of information (e.g., characters or features) to be located in an image (e.g., a video frame, a graphic, a picture, etc.). In some example implementations, some templates may indicate that particular information should be found within certain pixel coordinate locations of a display buffer. Information that may be represented using templates includes content provider channel numbers, content provider network names, station call letters, logos (graphic or text-based), etc.

The television events adapter 502b obtains the screen coordinates having an object of interest (block 1504). For example, the television events adapter 502b may retrieve the screen coordinates from the reference template obtained at block 1502 or from a data structure or other data store that stores information indicative of where objects of interest are displayed on a screen. In this manner, the television events adapter 502b can retrieve the objects of interest (e.g., by copying, extracting, or performing an optical character recognition) only from the indicated screen coordinates without needing to access or operate upon the contents of the entire screen. In this manner, an optical recognition process can be used to identify characters or features on a selected portion of a screen without operating on non-selected portions of the screen. An object of interest at the screen coordinates may be, for example, text (e.g., a network name, a channel number, etc.), a logo, or any other information. The television events adapter 502b retrieves the object of interest (block 1506) and determines whether the object of interest (located at the screen coordinates) matches the reference template (block 1508). For example, television events adapter 502b may retrieve an object of interest from a display frame buffer at a location indicated by the screen coordinates and compare the retrieved object of interest to information stored in the reference template. If the retrieved object of interest does not match the reference template (block 1508), the television events adapter 502b obtains a next reference template (block 1510) and control returns to block 1508 to determine whether the retrieved object of interest matches the next reference template. In some example implementations, different reference templates may be associated with information displayed at different screen coordinate locations. In such example implementations, the television events adapter 502b can obtain new screen coordinates each time it retrieves another reference template and retrieves another portion of a screen display as the object of interest based on those screen coordinates from a display buffer.

If at block 1508 the television events adapter 502b determines that the object of interest does match the reference template, the television events adapter 502b stores metadata indicative of the object of interest and a date-time stamp in a field metering data structure (block 1512). For example, the television events adapter 502b can retrieve the metadata from the reference template and store it in the field meter data structure 506. The example process of FIG. 15 is then ended and control returns to a calling function or process such as the example process of FIG. 13.

FIG. 16 depicts example machine or computer-readable instructions that may be executed to generate similarity and/ or exact hashes of media presented via the mobile communication devices 104 of FIG. 1. Initially, the meter 402 (FIGS. 4 and 5) retrieves rules from the rules/criteria data structure 508 (block 1602). The meter 402 can use the rules to determine when to generate exact hashes and when to generate similarity hashes. In addition, the rules may indicate which features, characteristics or portions of media content to hash. For example, a rule may specify that the meter 402 is to only generate one exact hash of a particular screen area for verifiably original media content (e.g., media content from a television broadcaster), but several similarity hashes from different screen portions or different media characteristics or features (e.g., different color components (R:G:B)) for duplicated or modified content that cannot be verified as being original. In some instances, rules may specify that the meter 402 is to generate exact hashes and similarity hashes for the same media content so that if the media content cannot be identified based on one or more exact hashes, one or more similarity hashes can be used to identify the media content. In some example implementations, the rules may indicate that the meter 402 is to generate similarity hashes for particular types of media that tend to differ in quality from device to device or network to network. For example, streaming video or audio may degrade in quality based on the type of device, service plan (e.g., bandwidth subscription), or network (e.g., available bandwidth or quality of service) used to stream the media. On the other hand, video or audio that is stored and then played back can be more consistent or similar in quality from device to device since its quality may not depend as much on streaming capabilities or available quality of service.

The meter 402 captures media content (block 1604) for which to generate hashes. For example, the meter 402 may capture a portion or portions of the media content via one of the event capture adapters 502 (FIG. 5). The meter 402 determines whether it should generate exact hashes (block 1606). If the rules indicate that the meter 402 should generate exact hashes (block 1606), the meter 402 identifies which features or portions to hash (block 1608) based on the retrieved rules. The meter 402 generates an exact hash for each feature or portion (block 1610) and stores the exact hash(es), a date-time stamp, and a media type for each hash in a field metering data structure (block 1612). In the illustrated example, the date-time stamp indicates when the media content was presented via a communication device 104, and the media type can be used to identify, for example, television media, music media, radio media, stored video media, web page media, still image media, etc. In the illustrated example, the hash(es), date-time stamps, and media type information are stored in the field meter data structure 506.

After the meter 402 stores the exact hash(es) (block 1612) or if the rules indicate that the meter 402 should not generate exact hashes (block 1606), the meter 402 determines whether it should generate similarity hashes (block 1614). If the meter 402 determines that it should generate similarity hashes (block 1614), the meter 402 identifies which features to hash (block 1616) based on the retrieved rules. As discussed above, features of the media content used to generate exact hashes may be different from features of the media content used to generate similarity hashes. The meter 402 generates a similarity hash for each feature (block 1618) and stores the similarity hash(es), a date-time stamp, and a media type for each hash in a field metering data structure (block 1620). In the illustrated example, the hash(es), date-time stamps, and the media type information are stored in the field meter data structure 506. The example process of FIG. 16 is then ended and control returns to a calling function or process such as the example process of FIG. 13.

Although the above example process of FIG. 16 is described as involving selectively generating exact hashes or similarity hashes based on particular rules, in some example implementations the meter 402 may be configured to always generate one type of hash and the generated hashes can subsequently be used as both exact and similarity hashes. For example, if a particular hash is not an exact or near-exact match with a reference hash, the same hash may be used as a similarity hash to determine whether the hash is more similar to one reference hash or signature than to another reference hash or signature.

Figure 17A:
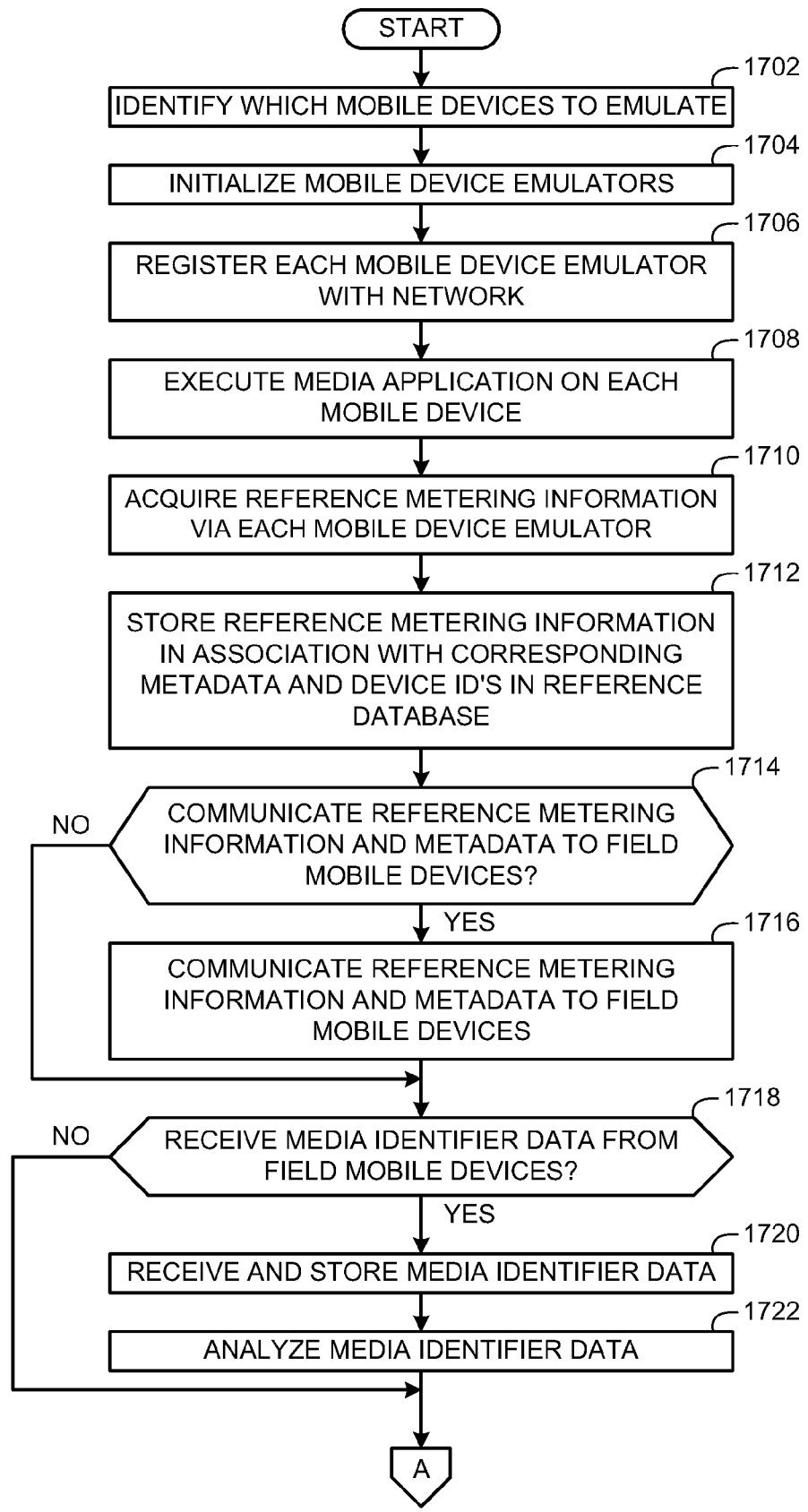
FIGS. 17A-17B depict example computer-readable instructions that may be executed to implement the server of FIGS. 1 and 6 to emulate mobile communication devices to generate reference metering information and analyze field-generated metering information received from the field mobile communication devices of FIG. 1.
Figure 17B:
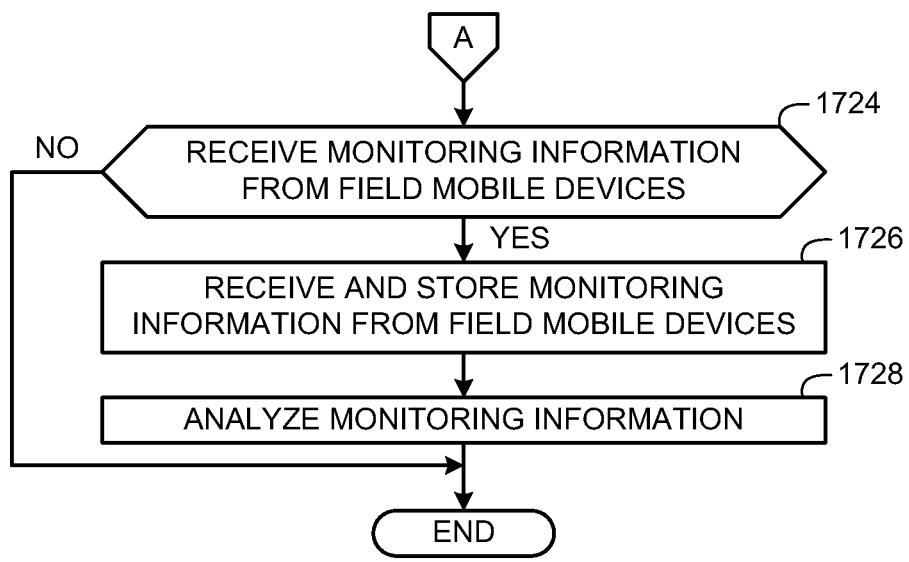

FIGS. 17A-17B depict example machine or computer-readable instructions that may be executed to implement the server 114 of FIGS. 1 and 6 to emulate mobile communication devices (e.g., the emulated receiving devices 602 of FIG. 6) to generate reference metering information and analyze metering information received from the field mobile communication devices 104 of FIG. 1. The example machine readable instructions of FIG. 17A begin when the server 114 identifies which mobile device(s) to emulate (block 1702). For example, the server 114 (e.g., the one or more emulated receiving devices 602) may receive an identification of a type of mobile device to emulate, may receive a list of mobile devices to emulate, may receive an identification of a mobile service provider and, using the identification, determine a mobile device compatible with and/or supported by the mobile service provider, etc. In the illustrated example, the server 114 can be configured to emulate different types of mobile devices (e.g., emulated wireless device terminals) having different media decoders or different media decoding capabilities to enable generating reference signatures based on media content that is decoded using the different media decoders.

The server 114 initializes one of the one or more emulated receiving devices 602 for the mobile device(s) identified in block 1702 (block 1704). For example, the server 114 may select one of the one or more emulated receiving devices 602 capable of emulating the identified mobile device (i.e., when multiple devices are provided) and/or may configure an available one of the one or more emulated receiving devices 602. Initializing the one or more emulated receiving devices may comprise, for example, establishing one or more parameter values for the one or more emulated receiving devices 602 (e.g., parameters associated with the mobile device to be emulated) such as, for example, a mobile device identifier, an international mobile equipment identity (IMEI), a manufacturer parameter of a mobile device, a model of a mobile device, an operating system of a mobile device, a subscriber identification or communication number (e.g., a telephone number), a current date and/or time, etc.). The parameter information may be received from an operator and/or may be extracted from a data source (e.g., a list of parameter information and/or an actual mobile device).

After initializing the one or more emulated receiving devices 602, the one or more emulated receiving devices 602 register with the communication network (block 1706). For example, if three mobile devices are to be emulated, three of the one or more emulated receiving devices 602 will be initialized and registered on the communication network. Each device is registered as a separate mobile device so that the network is aware of the three separate devices emulating three separate types of mobile devices. Accordingly, based on the communication network, each of the three emulated devices may receive media in different resolutions, different qualities, different formats, etc. Any method for registering the emulated mobile device on the network may be used. For example, the one or more emulated receiving devices 602 may send a registration message to the communication network.

After registering the one or more emulated receiving devices 602 on the communication network (block 1706), a media application is executed on each of the one or more emulated receiving devices 602 that are registered with the communication network (block 1708) and reference metering information (e.g., one or more exact hashes, one or more similarity hashes, metadata/media identifiers (e.g., channel name, channel number, program name, etc.)) is acquired via each of the one or more emulated receiving devices 602 (block 1710). In the illustrated example, each media application can use a different media decoder selected based on the respective mobile communication device that is emulated. Block 1708 and block 1710 may be implemented using techniques similar or identical as those described above in connection with the flow diagrams of FIGS. 7-16.

The one or more emulated receiving devices 602 then store the reference metering information in association with any identified metadata and corresponding device type ID's in the database 118 (block 1712). The device type ID's enable analyses processes (e.g., the example processes of FIGS. 18-20) to retrieve reference metering information corresponding to the same device types that generated received field-generated metering information. The analyzer 128 determines whether to communicate reference metering information and metadata to the field mobile communication devices (block 1714). If the analyzer 128 has been instructed to communicate reference metering information to the field mobile communication devices 104 (block 1714), the analyzer 128 transmits the reference information and the metadata from the database 118 to the field mobile communication devices 104 (block 1716). In this manner, the field mobile communication devices can analyze their field-generated metering information (e.g., hashes) based on the reference metering information.

If the analyzer 128 has been instructed not to communicate reference metering information to the field mobile communication devices 104 (block 1714) or after communicating information to the field mobile communication devices (block 1716), control proceeds to block 1718. At block 1718, the analyzer 128 determines if field media identifier data (e.g., information identifying media content presented and/or stored at the field mobile communication devices 104 that is sent by the field mobile communication devices 104 after comparing the media content to the reference metering information) is to be received from the field mobile communication devices 104 (e.g., in response to sending the reference metering information to the field mobile communication devices 104) (block 1718). If the analyzer 128 is to receive field media identifier data (block 1718), the analyzer 128 receives the field media identifier data and stores the field media identifier data in the database 606. The analyzer 128 then analyzes the field media identifier data according to identified business rules and/or instructions (block 1722). For example, the analyzer 128 may aggregate field media identifier data received from multiple field mobile communication devices 104 to generate statistical reports regarding the presentation of media content, may identify trends in the media content, may generate lists of presented media content, etc.

If the analyzer 128 is not to receive field media identifier data from field mobile communication devices 104 (block 1718) or after analyzing the media identifier data (block 1722), the analyzer 128 determines whether the analyzer 128 is to receive field-generated metering information from the field mobile communication devices 104 (block 1724). For example, the field-generated metering information may be hash values or other identifying information. According to the illustrated example, the monitoring information is not based on a comparison with the reference metering information (e.g., in an implementation where the analyzer 128 does not transmit the reference metering information to the field mobile communication devices 104). If the analyzer 128 is to receive field-generated metering information from the field mobile communication devices 104 (block 1724), the analyzer 128 receives the monitoring information and stores the monitoring information in the database 606 (block 1726). The analyzer 128 then analyzes the field-generated metering information (block 1728). For example, the analyzer 128 may perform any type of comparison analysis to determine the identity of media content presented at the field mobile communication devices 104. Example machine or computer-readable instructions for analyzing field-generated metering information are described below in conjunction with FIGS. 18 and 20.

If the analyzer 128 is not to receive field-generated metering information from the field mobile communication devices 104 (block 1724) or after analyzing the field-generated metering information (block 1728), the machine readable instructions illustrated in FIGS. 17A and 17B terminate. While the example machine readable instructions of FIGS. 17A and 17B include both sets of blocks 1714-1722 and blocks 1724-1728, some example implementations may alternatively include only one of the sets of blocks. For example, an implementation in which field mobile communication devices are to compare field-generated metering information to reference metering information may exclude blocks 1724-1728. Conversely, an implementation in which all comparisons are performed by the analyzer 128 may exclude blocks 1714-1722.

Figure 18:
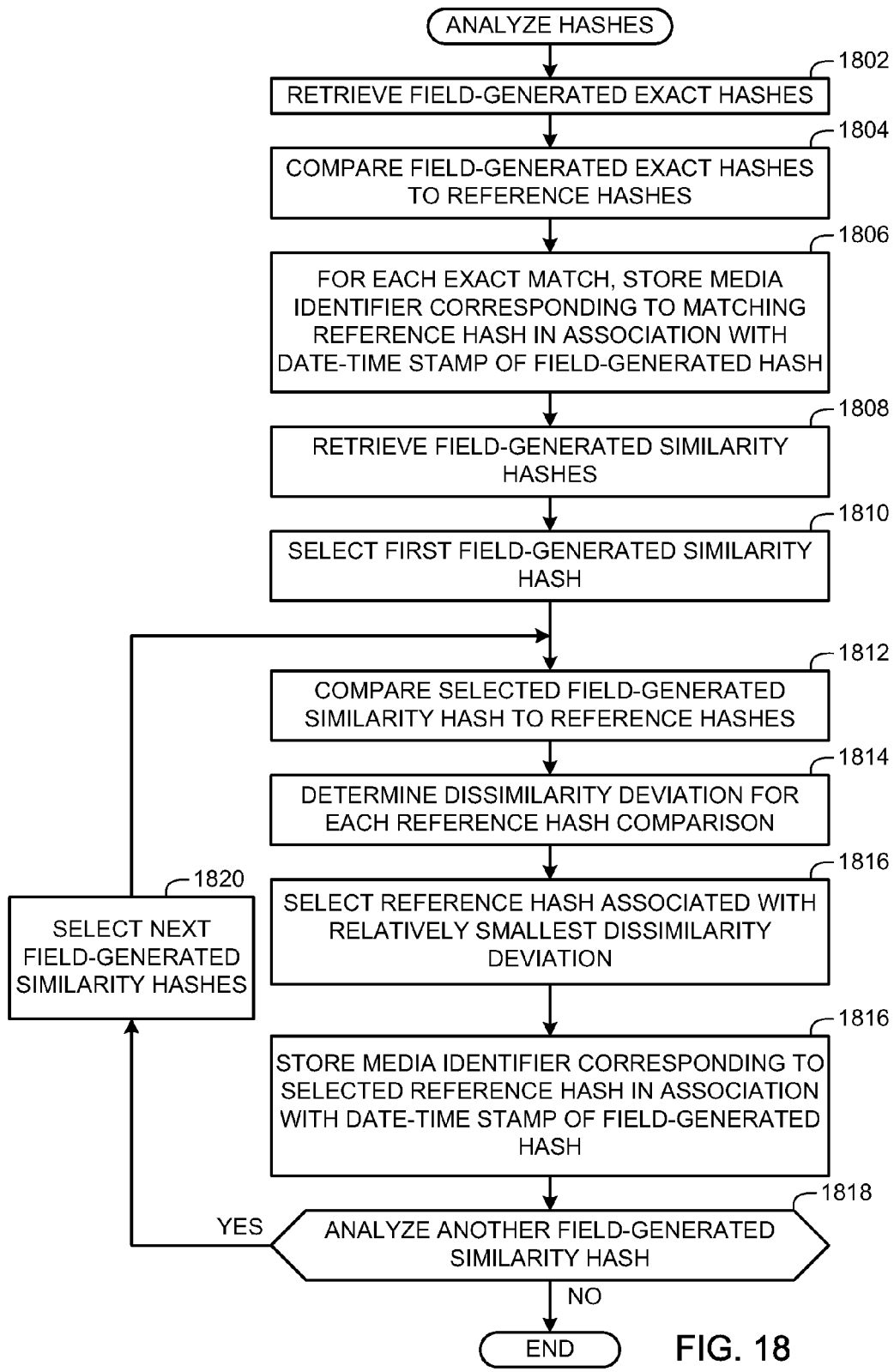
FIG. 18 depicts example computer-readable instructions that may be executed to analyze hashes via the server of FIGS. 1 and 6.

FIG. 18 depicts example machine or computer-readable instructions that may be executed to analyze hashes via the server 114 of FIGS. 1 and 6. The example process of FIG. 18 can be used to implement the example operation of block 1728 of FIG. 17. The example machine readable instructions of FIG. 18 begin when the analyzer 128 retrieves one or more field-generated exact hashes generated by the field mobile communication devices 104 and transmitted to the analyzer 128 (block 1802). For example, the analyzer 128 may retrieve the exact hash(es) from the database 606, the database 118, and/or may receive the exact hash(es) directly from the field mobile communication devices 104. The analyzer 128 compares the exact hashes to reference hashes in the reference metering information (e.g., reference metering information received from the one or more emulated receiving devices 602, stored in the database 606, and/or stored in the database 118) (block 1804). For example, the analyzer 128 may iteratively compare each exact hash to each reference hash until a match is found and/or all reference hashes have been processed. The reference hashes may be selected based on one or more criteria corresponding to media content with which the field-generated hashes may be associated. For example, if a field-generated hash corresponds to television content, the criteria for selecting a subset of reference hashes for comparison with that field-generated hash may be based on the date-time stamp of the field-generated hash. In this manner, the retrieved reference hashes may be those that correspond to television shows that were broadcast on different channels at or around the time indicated by the date-time stamp. In some example implementations, media type may also be used as criteria to select the reference hashes. In example implementations in which field-generated hashes can be retrieved from different device types (e.g., mobile phones from different manufacturers or having different media capabilities), the reference hashes retrieved by the analyzer 128 for the example process of FIG. 18 have the same device type ID as the device type ID associated with the field-generated hashes. The reference hashes may be reference exact hashes or reference hashes that may be used to perform both exact hash matching and similarity hash matching. When an exact or near-exact match is found, the analyzer 128 stores a media identifier corresponding to the matching reference exact hash in association with the date-time stamp of the field-generated similarity hash in the database 606 (block 1806).

After processing each of the exact hashes, the analyzer 128 retrieves one or more field-generated similarity hashes generated by the field mobile communication devices 104 and transmitted to the analyzer 128 (block 1808). For example, the analyzer 128 may retrieve the similarity hash(es) from the database 606, the reference metering information data structure 118, and/or may receive the similarity hash(es) directly from the field mobile communication devices 104. The analyzer 128 selects a first one of the field-generated similarity hashes (block 1810) and compares the selected field-generated similarity hash to all reference hashes (block 1810). The reference hashes (e.g., reference hashes received from the one or more emulated receiving devices 602, stored in the database 606, and/or stored in the database 118) may be selected based on one or more criteria corresponding to media content that the selected field-generated hash may be associated with. For example, if the field-generated similarity hash corresponds to television content, the criteria for selecting a subset of reference hashes for comparisons may be based on the date-time stamp of the field-generated similarity hash. In this manner, the retrieved reference hashes may be those that correspond to television shows that were broadcast on different channels at or around the time indicated by the date-time stamp. In some example implementations, media type may also be used as criteria to select the reference hashes. The reference hashes may be reference similarity hashes or reference hashes that may be used to perform both exact hash matching and similarity hash matching.

The analyzer 128 compares the selected field-generated similarity hash to the subset of reference hashes (block 1812) by, for example, iteratively comparing the field-generated similarity hash to each reference hash. The analyzer 128 determines a dissimilarity deviation (or dissimilarity score) for each reference hash comparison (block 1814) performed at block 1812. A dissimilarity deviation is a value that can quantify the amount of difference between two compared hashes. In the illustrated example, a lower dissimilarity deviation (or a lower dissimilarity score) indicates a higher similarity between a field-generated similarity hash and a reference hash. The analyzer 128 selects a reference hash associated with the relatively smallest dissimilarity deviation (block 1816). In this manner, the analyzer 128 can determine that the selected field-generated similarity hash is relatively more similar to the reference hash associated with the smallest dissimilarity deviation than the other reference hashes associated with relatively larger dissimilarity deviations.

The analyzer 128 stores a media identifier corresponding to the selected reference hash in association with the date-time stamp of the field-generated similarity hash in the database 606 (block 1812). If the analyzer 128 determines that it should analyze another field-generated similarity hash (block 1818), the analyzer 128 selects a next field-generated similarity hash (block 1820) and control returns to block 1812. Otherwise, the example process of FIG. 18 is ended.

While the machine readable instructions of FIG. 18 are described as processing all of the exact hashes followed by processing all of the similarity hashes, any order of processing may be used. For example, an exact hash and a similarity hash may be received from the field mobile communication devices 104 for each instance of a presentation of media content. In such an example, if a match for the exact hash is found using the operation of block 1804, the similarity hash may not be processed. However, if an exact hash cannot be found, the similarity hash may be processed using the operations of blocks 1812, 1814, and 1816.

Figure 19:
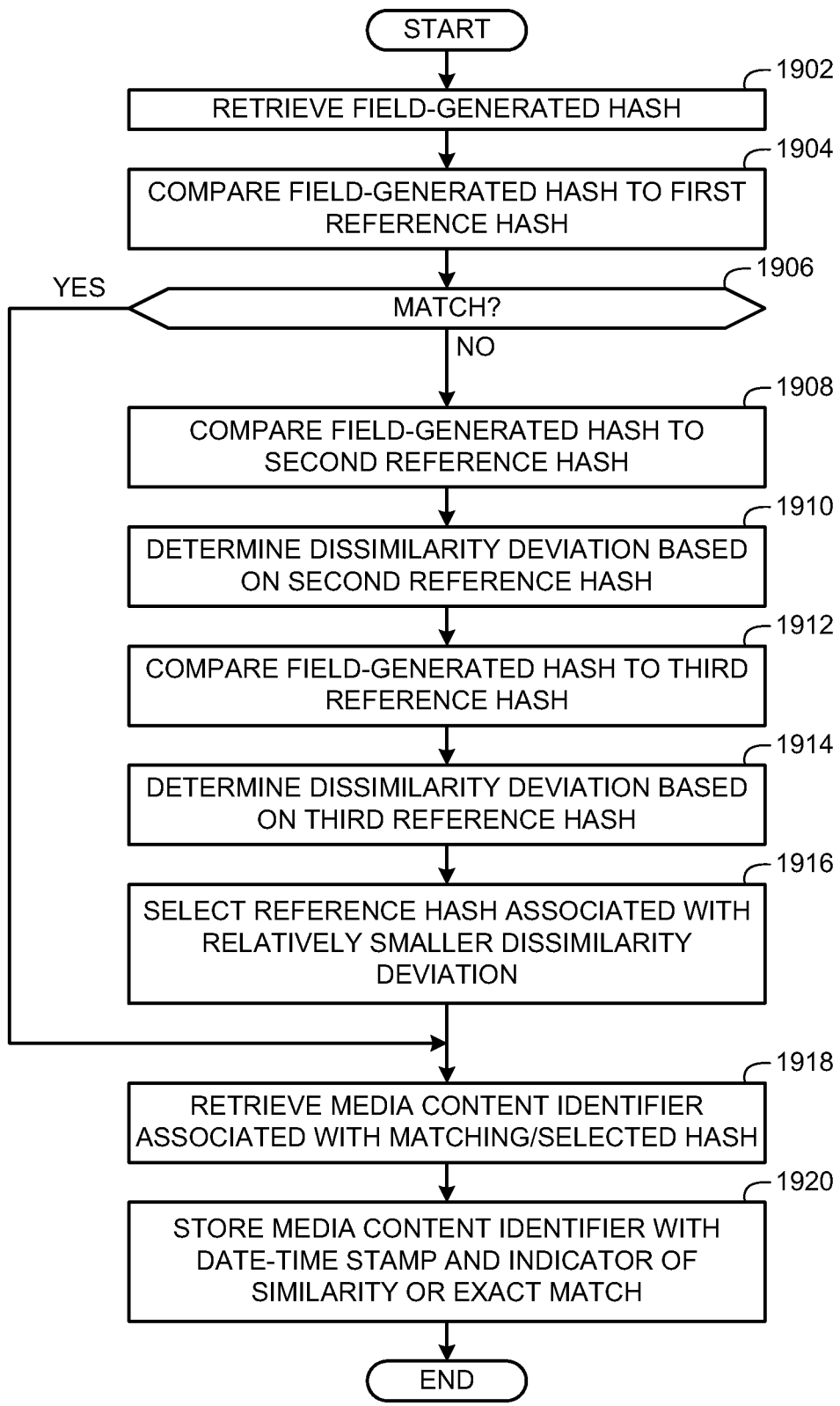
FIG. 19 depicts example computer-readable instructions that may be executed to perform another example process to analyze hashes via the server of FIGS. 1 and 6.

FIG. 19 depicts example computer-readable instructions that may be executed to perform another example process to analyze hashes via the server 114 of FIGS. 1 and 6. The example process of FIG. 19 can be used to implement the example operation of block 1728 of FIG. 17. Initially, the analyzer 128 retrieves a field-generated hash (block 1902). In the illustrated example, the retrieved field-generated hash is a hash that can be used to perform both exact hash matching and similarity hash matching. The analyzer 128 compares the field-generated hash to a first reference hash (block 1904). The reference hash may be obtained from the reference metering information data structure 118 (FIG. 1). In example implementations in which field-generated hashes can be retrieved from different device types (e.g., mobile phones from different manufacturers or having different media capabilities), the reference hashes retrieved by the analyzer 128 for the example process of FIG. 19 have the same device type ID as the device type ID associated with the field-generated hash. If the field-generated hash does not match the first reference hash (block 1906), the analyzer 128 compares the field-generated hash to a second reference hash (block 1908) and determines a dissimilarity deviation between the second reference hash and the field-generated hash (block 1910). The analyzer 128 compares the field-generated hash to a third reference hash (block 1912) and determines a dissimilarity deviation between the third reference hash and the field-generated hash (block 1914).

The analyzer 128 selects the reference hash associated with the relatively smaller dissimilarity deviation (block 1916). In some example implementations, when generating similarity hashes, a mobile communication device 104 (FIG. 1) may be configured to generate several similarity hashes for a particular media content because similarity hashes will not exactly match corresponding reference hashes. Thus, to increase the certainty that a similarity hash is close enough or similar enough to a reference hash (relative to another reference hash) to identify media content corresponding to the reference hash as having been consumed, the analyzer 128 may compare several field-generated similarity hashes generated by the mobile communication device 104 based on the same media content to several reference hashes generated based on a particular reference media content to ensure that all of the field-generated hashes are close enough to the reference hashes to confirm that a match has been found. For example, several similarity hashes may be generated using different characteristics of media content including, for example, different color components, different areas of a display screen, contrast characteristics, etc. An example process that can be used to analyze several similarity hashes corresponding to the same media content is described below in connection with FIG. 20.

After the analyzer 128 selects the second or third reference hash at block 1916 or if the analyzer 128 determines that the field-generated hash matches the first reference hash at block 1906, the analyzer 128 retrieves the media content identifier associated with the matching or selected hash (block 1918). The media content identifier may be, for example, a program title or any other unique program identifier.

The analyzer 128 stores the media content identifier along with the date-time stamp of the field-generated hash and an indicator of whether the media content identifier was identified using a similarity match or an exact (or near-exact) match (block 1920). In the illustrated example, the analyzer 128 stores the information in the database 606 (FIG. 6). In some example implementations, the indicator of a similarity match or an exact (or near-exact) match can be used to subsequently determine whether the presented media content was authentic or duplicated (e.g., non-authentic). Authentic media content is content received by a mobile communication device 104 from a legitimate media content provider, while duplicated media content may be media content copied and stored for subsequent playback. In some example implementations, field-generated metering information of duplicated media content can be flagged as media suspected as being pirated or unauthorized media content that was received and presented via the mobile communication device 104. In this manner, the popularity or pervasiveness of pirated media content among mobile users can be tracked. The example process of FIG. 19 then ends. Where numerous field-generated hashes are to be analyzed, the example process of FIG. 19 can be repeated until all of the field-generated hashes have been analyzed.

Figure 20:
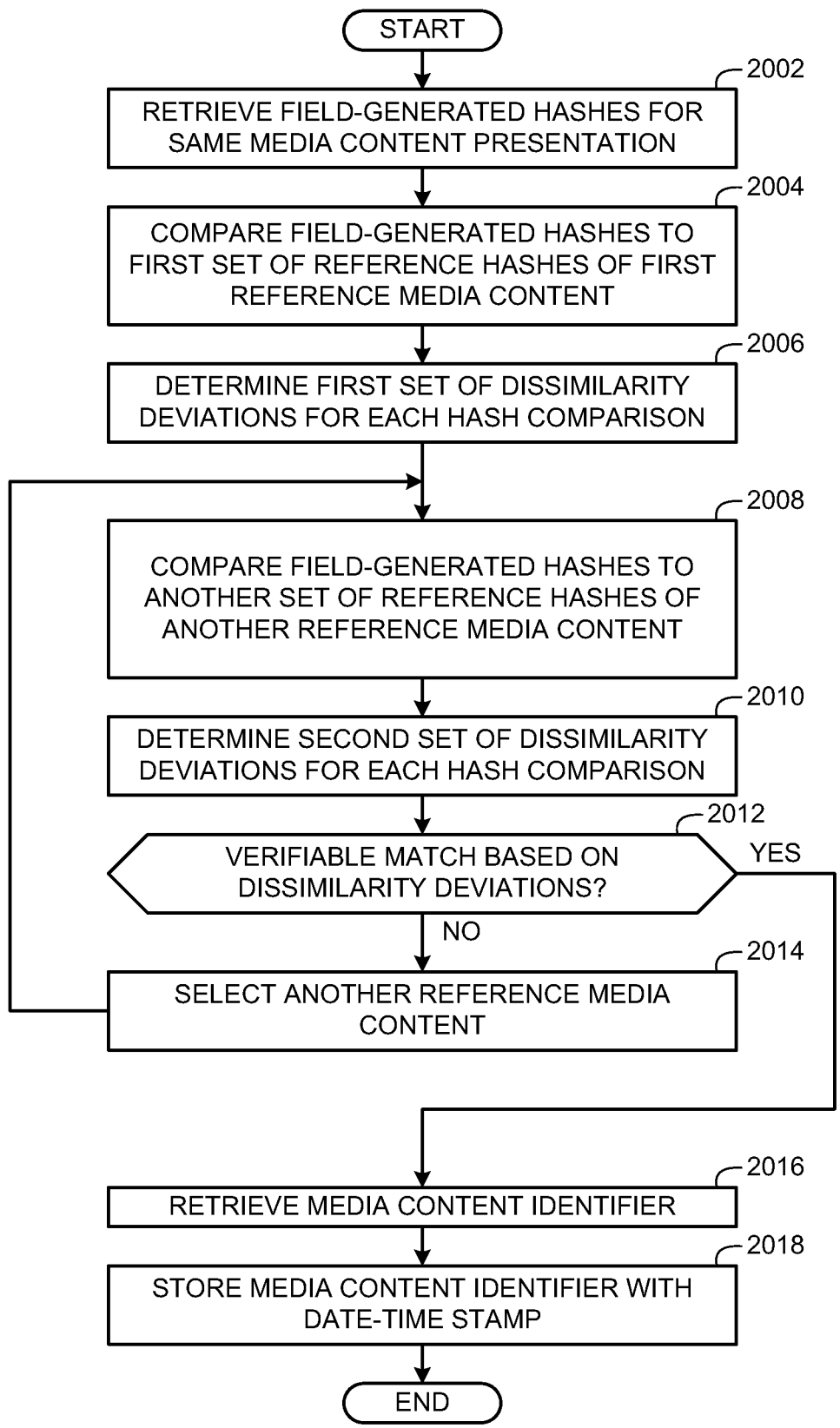
FIG. 20 depicts example computer-readable instructions that may be executed to perform another example process to analyze hashes via the server of FIGS. 1 and 6.

FIG. 20 depicts example computer-readable instructions that may be executed to perform another example process to analyze hashes via the server of FIGS. 1 and 6. The example process of FIG. 20 can be used to implement the operation of block 1728 of FIG. 17. As described below, the example process of FIG. 20 can be used to compare sets of field-generated similarity hashes generated by a mobile communication device 104 for the same media content to sets of reference similarity hashes generated for the same reference media content to identify the media content presented via the mobile communication device 104. Because similarity hashes are typically not used to find exact or near-exact matches with reference hashes, using a plurality of field-generated similarity hashes can be advantageously used to increase the confidence that the correct media content has been identified based on similarity hashes as having been presented via the mobile communication device 104. Initially, the analyzer 128 retrieves a set of field-generated similarity hashes for the same media content presentation (block 2002). The analyzer 128 then compares the field-generated hashes to a first set of reference hashes of a first reference media content (block 2004) and determines a first set of dissimilarity deviations for each hash comparison (block 2006). In example implementations in which field-generated hashes can be retrieved from different device types (e.g., mobile phones from different manufacturers or having different media capabilities), the reference hashes retrieved by the analyzer 128 for the example process of FIG. 20 have the same device type ID as the device type ID associated with the field-generated hashes. The analyzer 128 then compares the field-generated hashes to another set of reference hashes of another reference media content (block 2008) and determines a second set of dissimilarity deviations for each hash comparison (block 2010).

The analyzer 128 determines whether there is a verifiable match based on the dissimilarity deviations (block 2012). For example, a verifiable match may be one where all (or most) of the first dissimilarity deviations are relatively smaller than all (or most) of the second dissimilarity deviations. If there is not a match, the analyzer 128 selects another reference media content and control returns to block 2008. Otherwise, if a match is found (block 2012), the analyzer 128 retrieves the media content identifier of the reference media content that was identified as a match (block 2016) and stores the media content identifier along with a date-time stamp of the field-generated reference hashes in the database 606 (block 2018). The example process of FIG. 20 then ends.

Figure 21:
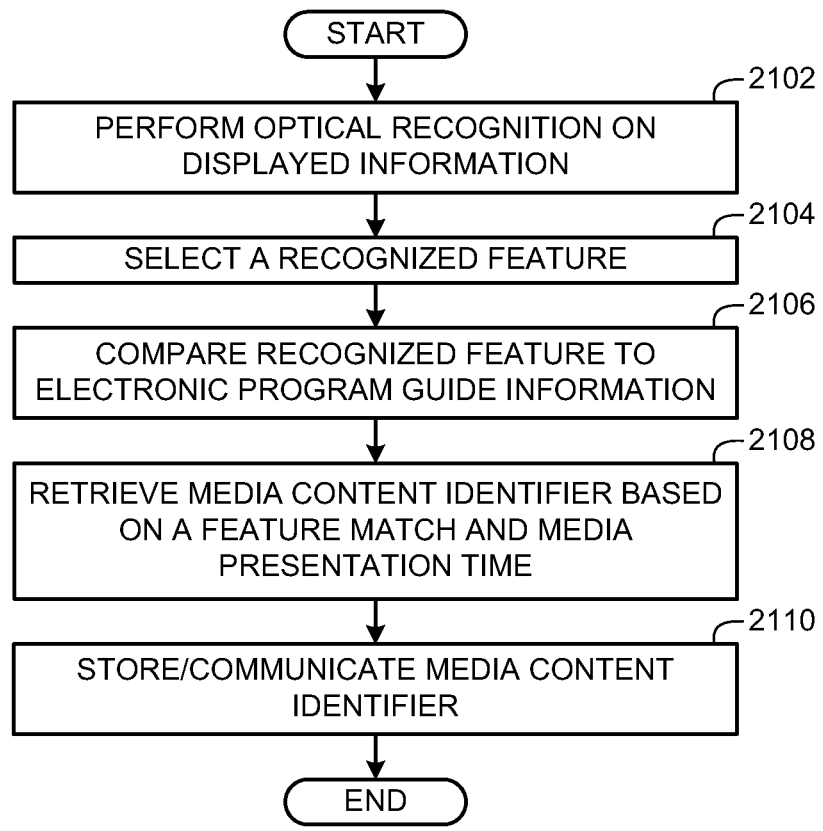
FIG. 21 depicts example computer-readable instructions that may be executed to identify media content using electronic program guide information.

FIG. 21 depicts example computer-readable instructions that may be executed to identify media content using electronic program guide information. In the illustrated example, the example process of FIG. 21 is implemented using a mobile communication device 104 (FIG. 1). In other example implementations, the operations of the example process of FIG. 21 may be performed using the mobile communication device 104 and the server 114 (FIGS. 1 and 6). For example, the mobile communication device 104 may collect field metering information based on presented media content, and the server 114 may analyze the collected field metering information based on electronic program guide information.

Initially, the meter 402 (FIGS. 4 and 5) performs an optical recognition process on displayed information (block 2102). The optical recognition process may be a text recognition process or any other feature recognition process (e.g., a logo recognition process). The displayed information may be a video frame, a still image, a web page, etc. Although the operation of block 2102 is described as performed by the meter 402, in other example implementations, television events adapter 502b may be used to perform the optical recognition process.

The meter 402 selects a recognized feature (block 2104). In some instances, the optical recognition process may result in recognition of two or more features (e.g., a displayed channel number, a displayed network name, a displayed logo, etc.). In any case, the meter 402 selects the feature which it is configured to use for comparing with electronic program guide information. For example, the meter 402 may be configured to select channel numbers for subsequent use to retrieve media content identifiers using electronic program guide information.

The meter 402 compares the recognized feature to electronic program guide information (block 2106). For example, the meter 402 can compare a recognized channel number with channel numbers in the electronic program guide. The meter 402 then retrieves a media content identifier based on a feature match and a media presentation time (block 2108). For example, the meter 402 can retrieve the media content identifier (e.g., a program title or unique program ID) from the electronic program guide of a program that is indicated as scheduled to be broadcasted on the recognized channel at the time at which the displayed information (from block 2102) was presented via the mobile communication device 104. The meter 402 can store the media content identifier in the field meter data structure 506 (FIG. 5) and/or communicate the media content identifier to the server 114 (block 2110). The server 114 subsequently identify the program presented by the mobile communication device 104 based on the media content identifier. The example process of FIG. 21 then ends.

FIG. 22 is a block diagram of an example processor system that may be used to perform the example processes of FIGS. 7-16, 17A, 17B, and 18-21 to implement the example systems, apparatus, and/or methods described herein. As shown in FIG. 22, the processor system 2210 includes a processor 2212 that is coupled to an interconnection bus 2214. The processor 2212 may be any suitable processor, processing unit or microprocessor. Although not shown in FIG. 22, the system 2210 may be a multi-processor system and, thus, may include one or more additional processors that are identical or similar to the processor 2212 and that are communicatively coupled to the interconnection bus 2214.

The processor 2212 of FIG. 22 is coupled to a chipset 2218, which includes a memory controller 2220 and an input/output (I/O) controller 2222. As is well known, a chipset typically provides I/O and memory management functions as well as a plurality of general purpose and/or special purpose registers, timers, etc. that are accessible or used by one or more processors coupled to the chipset 2218. The memory controller 2220 performs functions that enable the processor 2212 (or processors if there are multiple processors) to access a system memory 2224 and a mass storage memory 2225.

The system memory 2224 may include any desired type of volatile and/or non-volatile memory such as, for example, static random access memory (SRAM), dynamic random access memory (DRAM), flash memory, read-only memory (ROM), etc. The mass storage memory 2225 may include any desired type of mass storage device including hard disk drives, optical drives, tape storage devices, etc.

The I/O controller 2222 performs functions that enable the processor 2212 to communicate with peripheral input/output (I/O) devices 2226 and 2228 and a network interface 2230 via an I/O bus 2232. The I/O devices 2226 and 2228 may be any desired type of I/O device such as, for example, a keyboard, a video display or monitor, a mouse, etc. The network interface 2230 may be, for example, an Ethernet device, an asynchronous transfer mode (ATM) device, an 802.11 device, a digital subscriber line (DSL) modem, a cable modem, a cellular communication interface, etc. that enables the processor system 2210 to communicate with another processor system.

While the memory controller 2220 and the I/O controller 2222 are depicted in FIG. 22 as separate functional blocks within the chipset 2218, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method to monitor media delivered over wireless communication networks, comprising:

emulating first and second wireless devices being at least one of from different manufacturers or of different models, the first emulated wireless device to decode a first media encoding format associated with at least one of a first manufacturer or a first model of the first emulated wireless device, and the second emulated wireless device to decode a second media encoding format different from the first media encoding format and associated with at least one of a second manufacturer or a second model of the second emulated wireless device;

receiving first media via the first emulated wireless device and second media via the second emulated wireless device, the first media encoded using the first media encoding format, the second media encoded using the second media encoding format, and the first and second media corresponding to the same media content;

storing a first reference exact signature of a portion of the first media received at the first emulated wireless device and a first reference similarity signature of the same portion of the first media to monitor exposure to the media content via a third wireless device being at least one of from the same first manufacturer or of the same first model as the first emulated wireless device, the first reference exact signature to confirm exposure to the media content via the third wireless device when a panel metering signature from the third wireless device matches the first reference exact signature within a threshold, and the first reference similarity signature to confirm exposure to the media content via the third wireless device when the panel metering signature is relatively more similar to the first reference similarity signature than to another reference similarity signature unrelated to the first media; and storing a second reference exact signature and a second reference similarity signature of a portion of the second media received at the second emulated wireless device to monitor exposure to the media content via a fourth wireless device being at least one of from the same second manufacturer or of the same second model as the second emulated wireless device.

2. A method as defined in claim 1, wherein the first media encoding format is associated with a first media encoding standard, and wherein the second media encoding format is associated with a second media encoding standard different from the first media encoding standard.

3. A method as defined in claim 1, further comprising:
retrieving device information corresponding to the third wireless device of a panel member;
comparing the device information to at least one of the manufacturers or the models of the first and second emulated wireless devices; and
comparing the panel metering signature to one of the first reference signatures or the second reference signatures based on the comparison of the device information to the at least one of the manufacturers or the models of the first and second emulated wireless devices.

4. A method as defined in claim 3, further comprising crediting the media content with an instance of a presentation based on the comparison of the panel metering signature to the one of the first reference signatures or the second reference signatures.

5. A method as defined in claim 1, wherein the first and second media encoding formats are associated with at least one of different display resolutions, different transport protocols, or different compression algorithms.

6. A method as defined in claim 1, wherein the first and second media encoding formats are associated with at least one of different video encoding industry standards or different audio encoding industry standards.

7. A method as defined in claim 1, further comprising registering the first emulated wireless device with a communication network as being at least one of from the first manufacturer or of the first model, and registering the second emulated wireless device with the communication network as being at least one of from the second manufacturer or of the second model.

8. A method as defined in claim 7, wherein the first media encoding format is associated with a first display resolution based on the first emulated wireless device being registered with the communication network as being at least one of from the first manufacturer or the second model, and the second media encoding format being associated with a second display resolution different from the first display resolution based on the second emulated wireless device being registered with the communication network as being at least one of from the second manufacturer or the second model.

9. A method as defined in claim 1, wherein the first reference similarity signature is generated by hashing a global feature of an overall image of the first media in connection with a specific feature of the portion of the image.

10. A system to monitor media delivered over wireless communication networks, comprising:
a first emulated wireless device to decode a first media encoding format associated with at least one of a first manufacturer or a first model of the first emulated wireless device, the first emulated wireless device to receive first media encoded using the first media encoding format and to generate a first reference exact signature of a portion of the first media and a first reference similarity signature of the same portion of the first media;
a second emulated wireless device to decode a second media encoding format different from the first media encoding format and associated with at least one of a second manufacturer or a second model of the second emulated wireless device, the second emulated wireless device to receive second media encoded using the second media encoding format and to generate a second reference exact signature of a portion of the second media and a second reference similarity signature of the same portion of the second media, the first and second media corresponding to the same media content; and
a database to store the first reference exact signature and the first reference similarity signature from the first emulated wireless device to monitor exposure to the media content via a third wireless device being at least one of from the same first manufacturer or of the same first model as the first emulated wireless device, and to store the second reference exact signature and the second reference similarity signature from the second emulated wireless device to monitor exposure to the media content via a fourth wireless device being at least one of from the same second manufacturer or of the same second model as the second emulated wireless device, the first reference exact signature to confirm exposure to the media content via the third wireless device when a panel metering signature from the third wireless device matches the first reference exact signature within a threshold, and the first reference similarity signature to confirm exposure to the media content via the third wireless device when the panel metering signature is relatively more similar to the first reference similarity signature than to another reference similarity signature unrelated to the first media.

11. A system as defined in claim 10, wherein the first media encoding format is associated with a first display resolution of the first emulated wireless device, and wherein the second media encoding format is associated with a second display resolution of the second emulated wireless device and different from the first display resolution.

12. A system as defined in claim 10 further comprising an analyzer to:
retrieve device information corresponding to the third wireless device of a panel member;
compare the device information to at least one of the manufacturers or the models of the first and second emulated wireless devices; and
compare the panel metering signature to one of the first reference signatures or the second reference signatures based on the comparison of the device information to the at least one of the manufacturers or the models of the first and second emulated wireless devices.

13. A system as defined in claim 10, wherein the first and second media encoding formats are associated with at least one of different display resolutions, different transport protocols, or different compression algorithms.

14. A system as defined in claim 10, wherein the first emulated wireless device is to register with a communication network as being at least one of from the first manufacturer or of the first model, and the second emulated wireless device is to register with the communication network as being at least one of from the second manufacturer or of the second model.

15. A system as defined in claim 14, wherein the first media encoding format is associated with a first display resolution based on the first emulated wireless device being registered with the communication network as being at least one of from the first manufacturer or the second model, and the second media encoding format being associated with a second display resolution different from the first display resolution based on the second emulated wireless device being registered with the communication network as being at least one of from the second manufacturer or the second model.

16. A computer readable storage device or storage disk having instructions stored thereon that, when executed, cause a machine to at least:
  emulate first and second wireless devices being at least one of from different manufacturers or of different models, the first emulated wireless device to decode a first media encoding format associated with at least one of a first manufacturer or a first model of the first emulated wireless device, and the second emulated wireless device to decode a second media encoding format different from the first media encoding format and associated with at least one of a second manufacturer or a second model of the second emulated wireless device;
  receive first media via the first emulated wireless device and second media via the second emulated wireless device, the first media encoded using the first media encoding format, the second media encoded using the second media encoding format, and the first and second media corresponding to the same media content;
  store a first reference exact signature of a portion of the first media received at the first emulated wireless device and a first reference similarity signature of the same portion of the first media to monitor exposure to the media content via a third wireless device being at least one of from the same first manufacturer or of the same first model as the first emulated wireless device, the first reference exact signature to confirm exposure to the media content via the third wireless device when a panel metering signature from the third wireless device matches the first reference exact signature within a threshold, and the first reference similarity signature to confirm exposure to the media content via the third wireless device when the panel metering signature is relatively more similar to the first reference similarity signature than to another reference similarity signature unrelated to the first media; and
  store a second reference exact signature and a second reference similarity signature of a portion of the second media received at the second emulated wireless device to monitor exposure to the media content via a fourth wireless device being at least one of from the same second manufacturer or of the same second model as the second emulated wireless device.

17. A computer readable storage device or storage disk as defined in claim 16 having instructions stored thereon that, when executed, cause the machine to:
  retrieve device information corresponding to the third wireless device of a panel member;
  compare the device information to at least one of the manufacturers or the models of the first and second emulated wireless devices; and
  compare the panel metering signature to one of the first reference signatures or the second reference signatures based on the comparison of the device information to the at least one of the manufacturers or the models of the first and second emulated wireless devices.

18. A computer readable storage device or storage disk as defined in claim 16, wherein the first and second media encoding formats are associated with at least one of different display resolutions, different transport protocols, or different compression algorithms.

19. A computer readable storage device or storage disk as defined in claim 16 having instructions stored thereon that, when executed, cause the machine to register the first emulated wireless device with a communication network as being at least one of from the first manufacturer or of the first model, and register the second emulated wireless device with the communication network as being at least one of from the second manufacturer or of the second model.

20. A computer readable storage device or storage disk as defined in claim 19, wherein the first media encoding format is associated with a first display resolution based on the first emulated wireless device being registered with the communication network as being at least one of from the first manufacturer or the second model, and the second media encoding format being associated with a second display resolution different from the first display resolution based on the second emulated wireless device being registered with the communication network as being at least one of from the second manufacturer or the second model.

\* \* \* \* \*